(12) United States Patent
Hagiopol et al.

(10) Patent No.: US 9,834,890 B2
(45) Date of Patent: Dec. 5, 2017

(54) BLENDS OF POLYMERS AS WET STRENGTHENING AGENTS FOR PAPER

(71) Applicant: Georgia-Pacific Chemicals LLC, Atlanta, GA (US)

(72) Inventors: Cornel Hagiopol, Lilburn, GA (US); David F. Townsend, Grayson, GA (US); Clay E. Ringold, Decatur, GA (US); James W. Johnston, Suwanee, GA (US); Robert McDonald, Acworth, GA (US); Metric M. Simpson, Atlanta, GA (US); Frederick S. Potter, Oxford, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 15/162,016

(22) Filed: May 23, 2016

(65) Prior Publication Data

US 2016/0265163 A1    Sep. 15, 2016

Related U.S. Application Data

(62) Division of application No. 14/679,442, filed on Apr. 6, 2015, now Pat. No. 9,353,483, which is a division of application No. 14/108,492, filed on Dec. 17, 2013, now Pat. No. 8,999,110.

(60) Provisional application No. 61/739,329, filed on Dec. 19, 2012.

(51) Int. Cl.
| | |
|---|---|
| C08L 61/00 | (2006.01) |
| D21H 17/00 | (2006.01) |
| D21H 17/57 | (2006.01) |
| D21H 17/55 | (2006.01) |
| D21H 21/20 | (2006.01) |
| D21H 17/56 | (2006.01) |

(52) U.S. Cl.
CPC ............ *D21H 17/57* (2013.01); *D21H 17/55* (2013.01); *D21H 17/56* (2013.01); *D21H 21/20* (2013.01); *C08L 61/00* (2013.01)

(58) Field of Classification Search
None
See application file for complete search history.

(56) References Cited

U.S. PATENT DOCUMENTS

| | | | |
|---|---|---|---|
| 2007/0054144 A1* | 3/2007 | Dopico ............... | C08L 97/02 428/537.1 |
| 2007/0137821 A1 | 6/2007 | Riehle et al. | |
| 2007/0264896 A1 | 11/2007 | Smith et al. | |
| 2012/0199929 A1 | 8/2012 | Kamijyo et al. | |
| 2014/0020858 A1* | 1/2014 | Ringold ............. | D21H 21/20 162/164.6 |

* cited by examiner

*Primary Examiner* — Ana L Woodward
(74) *Attorney, Agent, or Firm* — Ram W. Sabnis

(57) ABSTRACT

Resin systems and methods for making and using same are provided. The method for making a paper product can include contacting a plurality of pulp fibers with a resin system. The resin system can include a first polyamidoamine-epihalohydrin resin and a second resin that can include a second polyamidoamine-epihalohydrin resin, a urea-formaldehyde resin, or a mixture thereof to produce a paper product. The first resin and the second resin can be sequentially or simultaneously contacted with the plurality of pulp fibers. The period for sequential addition between the first resin and the second resin is about 1 second to about 1 hour.

20 Claims, No Drawings

BLENDS OF POLYMERS AS WET STRENGTHENING AGENTS FOR PAPER

CROSS-REFERENCE TO RELATED APPLICATIONS

This application is a divisional of co-pending U.S. patent application Ser. No. 14/679,442, filed on Apr. 6, 2015, which is a divisional of U.S. patent application Ser. No. 14/108,492, filed on Dec. 17, 2013, now U.S. Pat. No. 8,999,110, which claims priority to U.S. Provisional Patent Application No. 61/739,329, filed on Dec. 19, 2012, which are all incorporated by reference herein.

FIELD

Embodiments described generally relate to paper strengthening agents. More particularly, such embodiments relate to wet strengthening agents.

BACKGROUND

Paper is sheet material containing interconnected small, discrete fibers. The fibers are usually formed into a sheet on a fine screen from a dilute water suspension or slurry. Typically paper is made from cellulose fibers, although occasionally synthetic fibers are used. The wet strength of paper is defined (U.S. Pat. No. 5,585,456) as the resistance of the paper to rupture or disintegration when it is wetted with water. Paper products made from untreated cellulose fibers lose their strength rapidly when they become wet, i.e., they have very little wet strength. Wet strength of ordinary paper is only about 5% of its dry strength. Various methods of treating paper products have been employed to overcome this disadvantage.

Wet strength resins applied to paper are either of the "permanent" or "temporary" type, which are defined by how long the paper retains its wet strength after immersion in water. While wet strength retention is a desirable characteristic in packaging materials, it presents a disposal problem. Paper products having such characteristics are degradable only under undesirably severe conditions. While some resins are known to impart temporary wet strength and thus would be suitable for sanitary or disposable paper uses, they often suffer from one or more drawbacks. For example, their wet strength is generally of a low magnitude (about one-half of the level achievable for permanent-type resins), they are easily attacked by mold and slime, or they can only be prepared as dilute solutions.

There is a need, therefore, for improved methods for imparting appropriate levels of wet strength and/or repulpability to paper products.

SUMMARY

Resin systems and methods for making and using same are provided. In at least one specific embodiment, the method for making a paper product can include contacting a plurality of pulp fibers with a resin system. The resin system can include a first polyamidoamine-epihalohydrin resin and a second resin that can include a second polyamidoamine-epihalohydrin resin, a urea-formaldehyde resin, or a mixture thereof to produce a paper product. The first resin and the second resin can be sequentially or simultaneously contacted with the plurality of pulp fibers. The period for sequential addition between the first resin and the second resin can be about 1 second to about 1 hour.

In at least one specific embodiment, the paper product can include a plurality of pulp fibers and an at least partially cured resin system. The resin system, prior to curing, can include a first polyamidoamine-epihalohydrin resin and a second resin that can include a second polyamidoamine-epihalohydrin resin, a urea-formaldehyde resin, or a mixture thereof. The first resin and the second resin can be sequentially or simultaneously contacted with the plurality of pulp fibers. The period for sequential addition between the first resin and the second resin can be about 1 second to about 1 hour.

In at least one specific embodiment, the composition can include a plurality of pulp fibers and a resin system. The resin system can include a first polyamidoamine-epihalohydrin resin and a second resin that can include a second polyamidoamine-epihalohydrin resin, a urea-formaldehyde resin, or a mixture thereof. The composition can be made by contacting first resin and the second resin sequentially or simultaneously with the plurality of pulp fibers. The period for sequential addition between the first resin and the second resin can be about 1 second to about 1 hour.

DETAILED DESCRIPTION

It has been surprisingly and unexpectedly discovered that mixing, blending, or otherwise combining two or more resins via sequential or simultaneous addition, with respect to one another, to the pulp fibers can provide resin systems with improved performance characteristics. For example, the resin systems can surprisingly and unexpectedly enhance the strength of paper such as the wet strength of paper and/or the repulpability of the paper. In another example, the resin systems can exhibit faster cure rates. In another example, resin systems that include the blend of two or more different resins that involve different curing mechanisms can surprisingly and unexpectedly show a synergetic effect as strengthening agents for paper. In at least some embodiments, some inter-molecular reactions can be developed between the two or more resins.

The resin system can be made by mixing, blending, stirring, contacting, or otherwise combining two or more resins or "component resins" with one another, where each resin or "component resin" has a different order of addition. In one embodiment, the first resin or the second resin can be added sequentially or simultaneously to the pulp fibers. In one or more embodiments, the resin system can include the first resin and the second resin, and optionally any number of additional resins, e.g., a third resin, a fourth resin, a fifth resin, or more, where the period of sequential addition of resins differ from one another yielding a resin system with improved properties.

The first resin can be present in the resin system in an amount of about 0.1 wt % to about 99.9 wt %, based on the combined solids weight of the first resin and the second resin. For example, the first resin can be present in an amount from a low of about 0.5 wt %, about 1 wt %, about 5 wt %, about 10 wt %, about 15 wt %, about 25 wt %, or about 35 wt % to a high of about 65 wt %, about 75 wt %, about 85 wt %, or about 95 wt %, based on the combined solids weight of the first and second resins. In another example, the first resin can be present from about 0.5 wt % to about 10 wt %, about 10 wt % to about 20 wt %, about 20 wt % to about 30 wt %, about 40 wt % to about 60 wt %, about 60 wt % to about 80 wt %, about 80 wt % to about 90 wt %, or about 90 wt % to about 99.5 wt %, based on the combined solids weight of the first and second resins. In another example, the first resin can be present from about 5 wt % to about 25 wt %, about 20 wt % to about 45 wt %, about 30 wt % to about 55 wt %, about 45 wt % to about 70 wt %, about 40 wt % to about 80 wt %, or about 65 wt % to about 85 wt %, based on the combined solids weight of the first and second resins. The second resin can be present in an amount from a low of about 0.5 wt %, about 1 wt %, about 5 wt %, about 10 wt %, about 15 wt %, about 25 wt %, or about 35 wt % to a high of about 65 wt %, about 75 wt %, about 85 wt %, or about 95 wt %, based on the combined solids weight of the first and second resins. In another example, the second resin can be present in an amount from about 0.5 wt % to about 10 wt %, about 10 wt % to about 20 wt %, about 20 wt % to about 30 wt %, about 40 wt % to about 60 wt %, about 60 wt % to about 80 wt %, about 80 wt % to about 90 wt %, or about 90 wt % to about 99.5 wt %, based on the combined solids weight of the first and second resins. In another example, the second resin can be present from about 5 wt % to about 25 wt %, about 20 wt % to about 45 wt %, about 30 wt % to about 55 wt %, about 45 wt % to about 70 wt %, about 40 wt % to about 80 wt %, or about 65 wt % to about 85 wt %, based on the combined solids weight of the first and second resins.

When three or more resins are combined to provide the resin blend or resin system, the three or more resins can be present in any amount. For example, in the context of a resin system that includes the first resin, the second resin, and a third resin, the first resin can be present in an amount of from about 0.5 wt % to about 99 wt %, the second resin can be present in an amount of from about 0.5 wt % to about 99 wt %, and the third resin can be present in an amount of from about 0.5 wt % to about 99 wt %, based on the combined solids weight of the first, second, and third resins. For simplicity and ease of description, the resin system will be further discussed and described in the context of a two resin system or a "two component" resin system, i.e., as a resin blend having a first resin and a second resin, combined with one another.

The resin system can be made by mixing, blending, stirring, contacting, or otherwise combining two or more resins with one another. The resins can be a liquid or a solution of the resin. For example, the first and/or second resins can be mixed, blended, stirred, contacted, or otherwise combined with one or more solvents. The solvent can be water, an organic solvent, or a combination thereof. For example, the resins and/or the resin system can be a in a liquid phase or solution. In at least one example, the resins and/or the resin system can be in the form of an aqueous solution.

Various different types of processes and/or reactor configurations can be used to produce the resin system, including, but not limited to, series reactors (i.e., sequentially-configured reactors) and single reactors. The resin system, for example, can be a reactor blend (also sometimes referred to as a chemical blend). A reactor blend is a blend that is formed (polymerized) in a single reactor. The resin system can also be a physical blend, i.e., a composition formed by the post-polymerization blending or mixing together of two or more resins, e.g., at least one high molecular weight resin and at least one low molecular weight resin, where each resin is polymerized using the same or different catalyst systems.

Blending resins can be used to make a resin system having one or more improved properties relative to either the first resin, the second resin, or a resin made to have the same or different molar ratio and/or molecular weight distribution as the resin system, thus yielding a resin system that can be more suited to the requirements for a particular application. While not wishing to be bound by any particular theory, it is believed that the individual resins bring their unique chemical and physical properties to the resin system. Also, the resins can produce synergistic effects with one another for certain properties without detrimentally affecting other properties.

Many kinds of resins can be used make the resin system. For example, the resins can include, but are not limited to, one or more polyamidoamine-epichlorohydrin (PAE) resins, one or more urea-formaldehyde (UF) resins, or any mixture thereof. In one example, the first resin can be a polyamidoamine-epichlorohydrin (PAE) resin or a urea-formaldehyde (UF) resin and the second resin can be a polyamidoamine-epichlorohydrin (PAE) resin or a urea-formaldehyde (UF) resin. The first resin can be present in an amount of about 1 wt % to about 99 wt %, based on the total weight the resin system. The second resin can be present in an amount of about 1 wt % to about 99 wt %, based on the total weight the resin system. The first resin or the second resin can be added sequentially or simultaneously to the pulp fibers, where the period for sequential addition between the resins is from about 1 second to about 1 hour. The first resin or the second resin can be added sequentially to the pulp fibers where the period for sequential addition between the first and second resin is about 1 second to about 1 hour. If the first resin and the second resin are both polyamidoamine-epichlorohydrin (PAE) resins, or urea-formaldehyde resins, or another resin the first and second resins can be different from one another. For example, the first and second resins can have different molecular weights, different structures, different molar ratios of reactants, and/or other differences. Such resin systems can be used to enhance the strength of paper, particularly the wet strength of paper. In other examples, the resin system can include three or more resins.

The viscosity of the resin system can vary widely. For example, the viscosity of the resin system can range from a low of about 1 centipoise (cP), about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the resin system can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the resin system can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be measured using a Brookfield viscometer. For example, the Brookfield Viscometer can be equipped with a small sample adapter such a 10 mL adapter and the appropriate spindle to maximize torque such as a spindle no. 31.

The resin system can have a pH from a low of about 1, about 2, about 3, about 4, about 5, about 6, about 7 to a high of about 8, about 9, about 10, about 11, about 12, or about 13. In another example, resin system can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The resin system, in addition to the first and second resins can include, but is not limited to, one or more other resins and/or additives. For example, the one or more other resins or additives can be combined with the first resin and/or the second resin and/or the combined first and second resins to produce the resin system. Illustrative additives can include, but are not limited to, waxes and/or other hydrophobic additives, water, filler material(s), extenders, surfactants, release agents, dyes, fire retardants, scavengers, biocides, or any combination thereof. Typical extenders can include, for example, wheat flour. Other suitable extenders can include, but are not limited to, polysaccharides, sulfonated lignins, and the like. Illustrative polysaccharides can include, but are not limited to, starch, cellulose, gums, such as guar and xanthan, alginates, pectin, gellan, or any combination thereof. Suitable polysaccharide starches can include, for example maize or corn, waxy maize, high amylose maize, potato, tapioca, and wheat starch. Other starches such as genetically engineered starches can include, but are not limited to, high amylose potato and potato amylopectin starches.

If the resin system includes one or more additives, the amount of each additive can be from a low of about 0.01 wt % to a high of 50 wt %, based on the total weight of the resin system. For example, the amount of any given additive can range from a low of about 0.01 wt %, about 0.05 wt %, about 0.1 wt %, about 0.5 wt %, or about 1 wt % to a high of about 3 wt %, about 5 wt %, about 7 wt %, or about 9 wt %, based on the total weight of the resin system. In another example, the amount of any given additive can be from a low of about 1 wt %, about 5 wt %, about 10 wt %, about 15 wt %, or about 20 wt % to a high of about 25 wt %, about 30 wt %, about 35 wt %, about 40 wt %, or about 45 wt %, based on the total weight of the resin system.

As noted above, the resin system can include one or more polyamidoamine-epichlorohydrin (PAE) resins. A variety of techniques are known in the art for making polyamidoamine-epichlorohydrin (PAE) resins can be employed. The polyamidoamine-epichlorohydrin (PAE) resin can be produced via any suitable process. For example, conventional PAE resins that can provide permanent wet strength to paper can be obtained by modifying polyamidoamine polymers or prepolymers such as the polyamidoamine prepolymer (A) by reaction with epichlorohydrin (B) ("epi") to form a polyamidoamine-epichlorohydrin (PAE) resin.

(A)

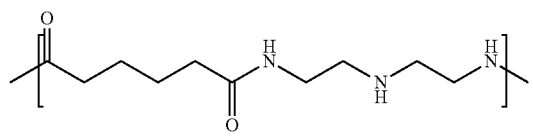

(B)

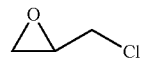

Conventional resin syntheses capitalize on the difunctional nature of epichlorohydrin to use the epoxy and chlorine groups for both cross-linking and generation of quaternary nitrogen sites. In these conventional syntheses, the asymmetric functionality of epichlorohydrin leads to ring opening upon reaction of its epoxy group with secondary amines, followed by the pendant chlorohydrin moiety either intra-molecularly cyclizing to generate azetidinium functionality or inter-molecularly (cross-linking) with another polyamidoamine molecule. Thus, the first step of reacting polyamidoamine prepolymer A with epi B occurs with ring-opening of the epoxy group by secondary amine groups of the prepolymer backbone at relatively low temperature. New functionalized polymer C having chlorohydrin pendant groups is generated, and this process typically results in little or no significant change in the prepolymer molecular weight.

(C)

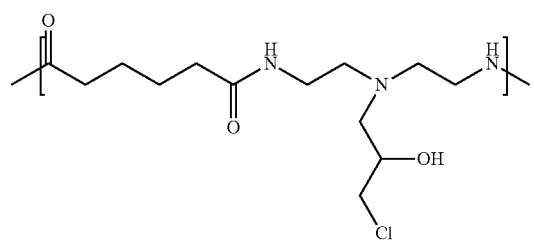

The second step involves two competing reactions of the pendant chlorohydrin groups: (1) an intramolecular cyclization which generates a cationic azetidinium chloride functionality, in which no increase in molecular weight is observed; and (2) an intermolecular alkylation reaction to cross-link the polymer, which significantly increases its molecular weight. The results of both reactions can be as illustrated in the PAE-epichlorohydrin resin structure D below. In practice, the alkylation of epichlorohydrin, the intra-molecular cyclization and the cross-linking reactions can occur simultaneously, but at different rates.

(D)

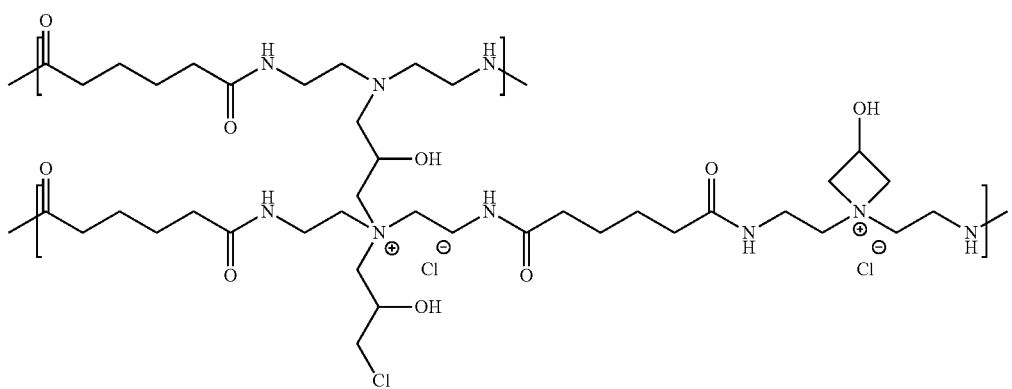

The finished wet strength polymer product can contain a small amount of residual pendant chlorohydrin as illustrated in structure D, and a 3-carbon cross-linked group with 2-hydroxyl functionality, with a fairly large amount of quaternary azetidinium chloride functionality. The product also can contain substantial amounts of the epichlorohydrin hydrolysis products 1,3-DCP, and 3-CPD.

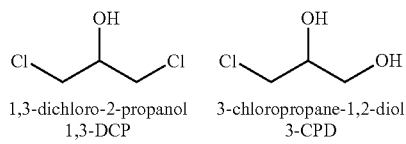 [SMILES: OC(CCl)CCl ; OCC(O)CCl]

1,3-dichloro-2-propanol
1,3-DCP 3-chloropropane-1,2-diol
3-CPD

The relative rates of the three main reactions in this conventional method, namely the pendant chlorohydrin formation (ring opening), cyclization to azetidinium ion groups (cationization), and cross-linking (intermolecular alkylation), generally approximate a rate of about 140:4:1, respectively, when carried out at room temperature. Therefore, the pendant chlorohydrin groups form very quickly from ring opening reaction of the epichlorohydrin epoxide and the secondary amine in the prepolymer. This first step is performed at lower temperature (for example, around 25-30° C.).

In the second step, the chlorohydrin groups then relatively slowly cyclize to form cationic azetidinium groups. Even more slowly, cross-linking occurs, for example, by: (1) a tertiary amine, for example, of a chlorohydrin pendent group reacting with moiety secondary amine; and/or (2) intermolecular alkylation of a tertiary amine with a pendant chlorohydrin moiety.

In order to maintain practical utility for minimum reaction cycle times, the conventional manufacturing process typically heat the reaction mixture to increase the reaction rates, for example to about 60° C. to about 70° C. The reactions can also be carried out at high solids content in order to maximize or increase reactor throughput and to provide finished wet strength resins at the highest solids possible to minimize shipping costs. High concentration favors the slower, inter-molecular reaction. Under these high temperature and high concentration conditions, the reaction rates between intramolecular cyclization and cross-linking become competitive. Thus, one problem encountered in the conventional manufacturing process is that the cross-linking reaction rate becomes fast enough that the desired viscosity end-point (molecular weight) is achieved at the expense of azetidinium ion group formation. If the reaction was allowed to continue beyond the desired viscosity end-point in order to generate higher levels of azetidinium groups, the reaction mixture would likely gel and form a solid mass.

Since both high azetidinium group content and high molecular weights can be useful for maximum wet strength efficiency of PAE resins, azetidinium group formation and cross-linking can be maximized or increased without gelling the product or providing a product that gels during storage. These conditions, coupled with the desire for high solids to minimize shipping costs, have been limiting aspects of the formation of higher efficiency wet strength resin products.

In other embodiments, using new functionally-symmetrical ("symmetrical") cross-linkers and mono-functional modifiers and separating into discrete steps the reaction of prepolymer with new cross-linkers from the reaction of intermediate cross-linked prepolymer with epichlorohydrin, new, non-conventional PAE resins with enhanced properties and/or improved flexibility in their synthesis are provided. In addition to providing generally improved wet tensile development over current technologies, the products and methods can provide higher azetidinium ion content, additional degrees of reactive functionalization, maximized molecular weight, and good storage stability. Moreover, the wet strength products can have substantially reduced levels of 1,3-DCP and 3-CPD which typically accompany epichlorohydrin wet strength resin synthesis.

Wet strength resins can be obtained by modifying amine-containing polymers (polyamine polymers) such as polyamine, polyamidoamine, polyethyleneimine (PEI), polyvinyl amine, and the like. Modifying amine-containing polymers can, for example, add more cationic charges and/or reactive groups and/or increase their molecular weight.

In one embodiment, the polyamine, which may be referred to herein as a polyamine prepolymer, can have the following structure:

(P)

where R can be an alkyl, a hydroxyalkyl, an amine, an amide, an aryl, a heteroaryl, or a cycloalkyl. In structure P, w can be an integer from 1 to about 10,000. As provided in the definitions section, the R groups such as "alkyl" or "hydroxyalkyl" are intended to provide a convenient description in which the conventional rules of chemical valence apply; therefore, R of structure P may be described as alkyl or hydroxyalkyl, which is intended to reflect the "R" group is divalent and may alternatively be described as a hydroxyalkylene.

The most widely used and most effective wet strength resin products are generally derived from polyamidoamine prepolymers reacted with epichlorohydrin, to form so-called polyamidoamine-epichlorohydrin (PAE) resins. Therefore, when polyamidoamines are used to exemplify the a process or resin disclosed herein, it is intended that the disclosure, process, and resin are not limited to polyamidoamine-based systems, but are applicable to any amine-containing polymer (polyamine) such as structure P and other amine-containing polymers.

Epichlorohydrin is a difunctional compound having different, hence "asymmetric", chemical functionalities, epoxy and chlorine groups. This asymmetric functionality allows the epichlorohydrin ring to open upon reaction with the epoxy group with secondary amines, followed by the pendant chlorohydrin moieties used for both: (1) intramolecular cyclization to generate a cationic azetidinium functionality; or 2) intermolecular cross-linking the polymer to increase molecular weight. Epichlorohydrin resin structure D illustrates the result of both reactions in a polyamidoamine-epichlorohydrin (PAE) resin.

Discussed and described herein are formulations and processes for making new, non-conventional PAE resins with increased levels of cationic charge from enhanced azetidinium ion content (greater charge density), additional functionality, optimized or maximized molecular weights, high solids contents, and/or lower concentrations of DCP and/or CPD. In an aspect, the disclosed method separates the resin synthesis into two separate and controllable steps. The first constructs an intermediate molecular weight, cross-linked prepolymer, prepared upon reacting the PAE prepolymer with a functionally-symmetric cross-linker. Unlike the function of the asymmetric cross-linker epichlorohydrin, the symmetric cross-linkers of this disclosure utilize the same moiety for reaction with both prepolymer secondary amine groups to effect cross-linking. If desired, monofunctional groups can be used before, after, or during the cross-linking step to impart additional functionality to a prepolymer without the cross-linking function. The second step utilizes epichlorohydrin to impart cationic functionality without it being required for any cross-linking function, by using a reduced amount of epichlorohydrin to maximize azetidinium ion formation on the polymer. This new, non-conventional process stands in contrast to conventional practice which is limited by the need to optimize competing azetidinium ion formation and cross-linking mechanisms that occur simultaneously.

Polyamine Prepolymer

A range of polyamines (polyamine prepolymers) can be used as a precursor to the wet strength resins disclosed herein. The polyamine prepolymers can include primary and/or secondary amine moieties that are linked with at least one spacer. By way of example, in one aspect, the polyamine, which can be referred to herein as a polyamine prepolymer, can have the following structure:

where R can be, for example, an alkyl, a hydroxyalkyl, an amine, an amide, an aryl, heteroaryl, or a cycloalkyl. In structure P, w can be an integer from 1 to about 10,000; alternatively, from 1 to about 5,000; alternatively, from 1 to about 3,000; alternatively, from 1 to about 1,000; alternatively, from 1 to about 100; or alternatively, from 1 to about 10. These "R" groups, for example "alkyl", are intended to provide a convenient description of the specified groups that are derived from formally removing one or more hydrogen atoms (as needed for the particular group) from the parent group. Therefore, the term "alkyl" in structure P would apply the conventional rules of chemical valence, but would include, for example, an "alkanediyl group" which is formed by formally removing two hydrogen atoms from an alkane (either two hydrogen atoms from one carbon atom or one hydrogen atom from two different carbon atoms). Such an alkyl group can be substituted or unsubstituted groups, can be acyclic or cyclic groups, and/or may be linear or branched unless otherwise specified. A "hydroxyalkyl" group includes one or more hydroxyl (OH) moieties substituted on the "alkyl" as defined.

In this aspect and unless otherwise indicated, alkyl R of structure P can be an alkyl moiety that is linear (straight chain) or branched. Moiety R can also be a cycloalkyl, that is, a cyclic hydrocarbon moiety having from 1 to about 25 carbon atoms. For example, R can have from 1 to 25, from 1 to 20, from 1 to 15, from 1 to 12, from 1 to 10, from 1 to 8, from 1 to 6, or from 1 to 4 carbon atoms. Also by way of example, R can have from 2 to 10, 2 to 8, 2 to 6, or 2 to 4 carbon atoms. In a further aspect, R can be a $C_1$ moiety, a $C_2$ moiety, a $C_3$ moiety, a $C_4$ moiety, a $C_5$ moiety, a $C_6$ moiety, a $C_7$ moiety, a $C_8$ moiety, a $C_9$ moiety, a $C_{10}$ moiety, a $C_{11}$ moiety, a $C_{12}$ moiety, a $C_{13}$ moiety, a $C_{14}$ moiety, a $C_{15}$ moiety, a $C_{16}$ moiety, a $C_{17}$ moiety, a $C_{18}$ moiety, a $C_{19}$ moiety, a $C_{20}$ moiety, a $C_{21}$ moiety, a $C_{22}$ moiety, a $C_{23}$ moiety, a $C_{24}$ moiety, a $C_{25}$ moiety, a $C_{26}$ moiety, a $C_{27}$ moiety, a $C_{28}$ moiety, a $C_{29}$ moiety, a $C_{30}$ moiety.

In the polyamine prepolymer structure P illustrated supra, R also can be a poly-primary amine, such as polyvinyl amine and its copolymers. Examples of a poly-primary amine that can constitute R in structure P include, but are not limited to the following structures, as well as copolymers with olefins and other unsaturated moieties, where n can be an integer from 1 to about 25:

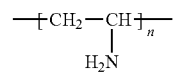

Alternatively, n can be an integer from 1 to about 20; alternatively, from 1 to about 15; alternatively, from 1 to about 12; alternatively, from 1 to about 10; or alternatively, from 1 to about 5. In another aspect, n can be 1, 2, 3, 4, 5, 6, 7, 8, 9, 10, 11, 12, 13, 14, 15, 16, 17, 18, 19, 20, 21, 22, 23, 24, or 25.

Suitable polyamines (polyamine prepolymers) for use in preparing resins discussed and described herein include, but are not limited to, polyalkylene polyamines, such as polyethylenepolyamines including diethylenetriamine (DETA), triethylenetetramine (TETA), aminoethyl piperazine, tetraethylenepentamine, pentaethylenehexamine, N-(2-aminoethyl)piperazine, N,N-bis(2-aminoethyl)-ethylenediamine, diaminoethyl triaminoethylamine, piperazinethyl triethylenetetramine, and the like. Also useful in preparing polyamine prepolymers for use in the resin preparations of this disclosure include, ethylene diamine, low molecular weight polyamidoamines, polyvinylamines, polyethyleneimine (PEI) and copolymers of vinyl amine with other unsaturated co-polymerizable monomers such as vinyl acetate and vinyl alcohol.

According to an aspect of polyamine prepolymer P, w is a number range corresponding to the polyamine prepolymer weight average molecular weight (Mw) from about 2,000 to about 1,000,000. The Mw of polyamine prepolymer P can also can be from about 5,000 to about 750,000; alternatively, from about 7,500 to about 500,000; alternatively, from about 10,000 to about 200,000; alternatively, from about 20,000 to about 150,000; or alternatively, from about 30,000 to about 100,000.

Polyamidoamine Prepolymer

A range of polyamidoamine prepolymers also can be used as a precursor to the wet strength resins discussed and described herein. The polyamidoamine prepolymers can be made by the reaction of a polyalkylene polyamine having at least two primary amine groups and at least one secondary amine group with a dicarboxylic acid, in a process to form a long chain polyamide containing the recurring groups as disclosed herein. In one aspect, the polyamidoamine prepolymer can have the following structure (X):

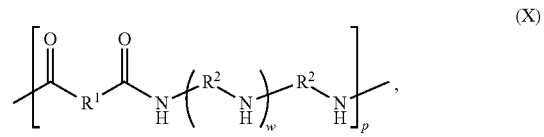

where $R^1$ is $(CH_2)m$, where m is 2, 3, 4, or 5; $R^2$ is $(CH_2)n$, where n is 2, 3, or 4; w is 1, 2, or 3; and p is a number range corresponding to the polyamidoamine prepolymer Mw from about 2,000 to about 1,000,000. The Mw also can be from about 5,000 to about 100,000; alternatively, from about 7,500 to about 80,000; alternatively, from about 10,000 to about 60,000; alternatively, from about 20,000 to about 55,000; or alternatively, from about 30,000 to about 50,000.

In an aspect, the polyamidoamine prepolymer can have the following structure (Y):

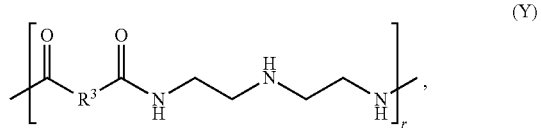

where $R^3$ is $(CH_2)q$, where q is from 0 to 40; and r is a number range corresponding to the polyamidoamine prepolymer Mw from about 2,000 to about 1,000,000. Similarly, the Mw also can be from about 5,000 to about 100,000; alternatively, from about 7,500 to about 80,000; alternatively, from about 10,000 to about 60,000; alternatively, from about 20,000 to about 55,000; or alternatively, from about 30,000 to about 50,000. Thus, in the structure $(CH_2)q$, q can also range from 0 to about 40; alternatively, from 0 to about 35; alternatively, from 0 to about 30; alternatively, from 0 to about 25; alternatively, from 0 to about 20; alternatively, from 0 to about 15; alternatively, from 0 to about 12; alternatively from 1 to about 40, alternatively from 1 to about 35, alternatively from 1 to about 30, alternatively from 1 to about 25, alternatively from 1 to about 20, alternatively from 1 to about 15, alternatively, from 1 to about 12; alternatively, from 1 to about 10; alternatively, from 1 to about 8; or alternatively, from 1 to about 6.

In a further aspect, the polyamidoamine prepolymer also may have the following structure (Z):

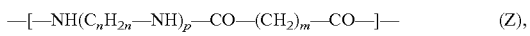

—[—NH(C$_n$H$_{2n}$—NH)$_p$—CO—(CH$_2$)$_m$—CO—]— (Z), where n is 1 to 8; p is 2 to 5; and m is 0 to 40, and molecular weight ranges similar to those of formula (X) and (Y) apply. For example, the Mw can be from about 2,000 to about 1,000,000. The Mw also can be from about 5,000 to about 100,000; alternatively, from about 7,500 to about 80,000; alternatively, from about 10,000 to about 60,000; alternatively, from about 20,000 to about 55,000; or alternatively, from about 30,000 to about 50,000

As disclosed, suitable polyamidoamines can be prepared by reacting a dicarboxylic acid (diacid), or a corresponding dicarboxylic acid halide or diester thereof, with a polyamine such as a polyalkylene polyamine. Suitable polyamines include those polyamines (polyamine prepolymers) disclosed herein that can be used as precursors for the wet strength resins themselves. For example, the polyamidoamine can be made by reacting one or more polyalkylene polyamines, such as polyethylenepolyamines including ethylenediamine itself, Diethylenetriamine (DETA), triethylenetetramine (TETA), aminoethyl piperazine, tetraethylenepentamine, pentaethylenehexamine, N-(2-aminoethyl) piperazine, N,N-bis(2-aminoethyl)-ethylenediamine, diaminoethyl triaminoethylamine, piperazinethyl triethylenetetramine, and the like, with one or more polycarboxylic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as Δ4-cyclohexenedicarboxylic; aromatic acids such as phthalic, isophtalic, terephthalic, 2,3-naphthalenedicarboxylic, benzene-1,4-diacetic, and heteroaliphatic acids such as diglycolic, thiodiglycolic, dithiodiglycolic, iminodiacetic and methyliminodiacetic. In one embodiment, diacids and their related diesters of the formula $RO_2C(CH_2)_nCO_2R$ (where n=1 to 10 and R=H, methyl, or ethyl), and mixtures thereof can be used. Adipic acid is readily available and is often used.

Symmetric Cross-Linker

Generally, the secondary amines of the polyamine prepolymers can be reacted with one or more symmetrical cross-linkers. In an aspect, this reaction can provide for a greater degree of control over the cross-linking process. This reaction can also provide an intermediate cross-linked prepolymer with a higher molecular weight than the starting prepolymer. The viscosity end-point and thus the molecular weight of the intermediate can be easily pre-determined and controlled simply by the amount of symmetrical cross-linker employed. The cross-linking reaction can proceed to an end-point as the cross-linker is consumed and stop when consumption of cross-linker is complete. A decreased and measurable amount of secondary amine functionality can remain available for further functionalization.

In this cross-linking step, the polyamine prepolymer can be reacted with a deficiency of the symmetric cross-linker, based on the total amount of secondary amines available for cross-linking, to provide a partially cross-linked polyamine prepolymer. Thus, the partially cross-linked polyamine prepolymer can have a higher molecular weight than the polyamine prepolymer, even though it is an intermediate in the process and it retains a portion of the secondary amine groups present in the polyamine prepolymer. In a further aspect, the partially cross-linked prepolymer can retain a majority of the secondary amine groups present in the polyamine prepolymer, because less than 50% of the stoichiometry amount of symmetric cross-linker generally is used.

Based on the prepolymer repeating unit having a single secondary amine subject to reaction, and the symmetric cross-linker having two reactive moieties, a stoichiometric reaction of prepolymer to cross-linker requires 2:1 molar ratio, and practically, a 2:1 or higher molar ratio of prepolymer to cross-linker is utilized. In one aspect, the symmetric cross-linker to prepolymer molar ratios can be selected to provide more than 0%, but less than 50%, less than 45%, less than 40%, less than 35%, less than 30%, less than 25%, less than 20%, less than 15%, less than 10%, less than 5%, less than 4%, less than 3%, less than 2%, less than 1%, less than 0.75%, or less than 0.5% of the stoichiometric ratio of cross-linker to prepolymer. These values reflect the combined molar amounts when using more than one symmetric cross-linker.

Examples of symmetric cross-linkers include, but are not limited to, a di-acrylate, a bis(acrylamide), a di-epoxide, and a polyazetidinium compound. By way of example, useful symmetric cross-linkers can be selected from or can comprise, the following:

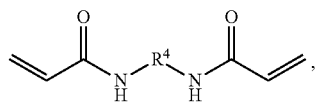

where $R^4$ is $(CH_2)_t$ and t is 1, 2, or 3;

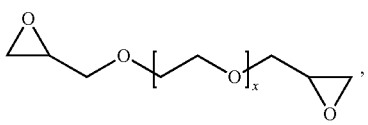

where x is from about 1 to about 100;

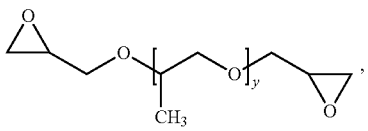

where y is from about 1 to about 100;

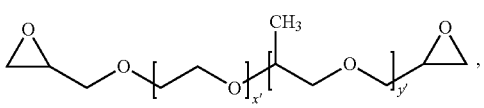

where x' is from about 0 to 100, y' is from about 0 to 100, and x'+y' is from about 1 to about 100; and/or

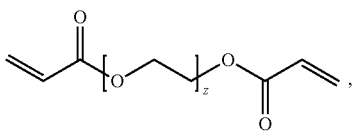

where z is from about 1 to about 100; including any combination thereof.

Specific examples of symmetric cross-linkers can be selected from, or alternatively can include, N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds, and any combination thereof.

In accordance with a further aspect, the symmetric cross-linker can be selected from or can include certain polymers or co-polymers that have a type of functional moiety that is reactive with secondary amines, that is, that can function as a symmetrical cross-linker according to this disclosure. In one aspect, these polymeric symmetric cross-linkers can be polymers or copolymers that comprise azetidinium functional groups. These polymeric symmetric cross-linkers can be, for example, copolymers of acrylates, methacrylates, alkenes, dienes, and the like, with azetidinium-functionalized monomers such as 1-isopropyl-3-(methacryloyloxy)-1-methylazetidinium chloride Q or 1,1-diallyl-3-hydroxyazetidinium chloride R, the structures of which are illustrated.

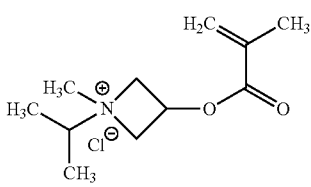

Q

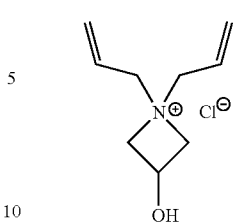

R

The polymeric symmetric cross-linkers also can be or can include, for example, copolymers of acrylates, methacrylates, alkenes, dienes, and the like, with other azetidinium-functionalized monomers such as compounds S, T, or U, as shown here.

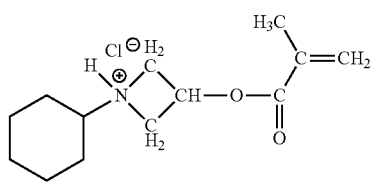

S

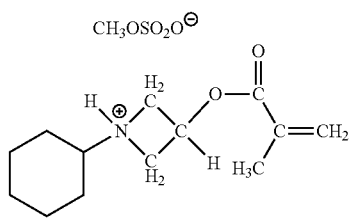

T

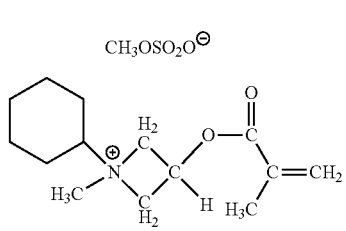

U

In another embodiment, the symmetric cross-linker can be selected from or can include a copolymer of an acrylate, a methacrylate, an alkene, or a diene, with an azetidinium-functionalized monomer selected from Q, R, S, T, U, and a combination thereof, where the fraction of azetidinium-functionalized monomer to acrylate, methacrylate, alkene, or diene monomer in the copolymer can be from about 0.1% to about 12%. In a further aspect, the fraction of azetidinium-functionalized monomer to acrylate, methacrylate, alkene, or diene monomer in the copolymer can be from about 0.2% to about 10%; alternatively, from about 0.2% to about 10%; alternatively, from about 0.5% to about 8%; alternatively, from about 0.75% to about 6%; or alternatively, from about 1% to about 5%. Examples of these types of symmetric cross-linker polymers and co-polymers can be found in the following references, each of which is incorporated herein by reference in pertinent part: Y. Bogaert, E. Goethals and E. Schacht, Makromol. Chem., 182, 2687-2693 (1981); M. Coskun, H. Erten, K. Demirelli and M. Ahmedzade, Polym. Degrad. Stab., 69, 245-249 (2000); and U.S. Pat. No. 5,510,004.

In other embodiment, the symmetric cross-linker can be selected from or can include a minimally azetidinium-functionalized polyamidoamine. That is, the polyamidoamine can have minimal azetidinium functionalization, which is the reactive moiety in this type of symmetric cross-linker. In this case, the cross-linking function can be effected by the azetidinium moieties, which can react with secondary amines of the polyamidoamine prepolymer. Polyamidoamines that can be used to prepare the minimally azetidinium-functionalized polyamidoamines can have the same general structures and formulas that can be used for the preparation of the resin itself, such as structures X, Y, and Z illustrated herein. An example of a minimally azetidinium-functionalized polyamidoamine suitable for use as a symmetric cross-linker is illustrated in the following structure:

of minimally azetidinium-functionalized polyamidoamine is provided in, for example, U.S. Pat. No. 6,277,242.

As illustrated by the molar ratios of the symmetric cross-linker to the PAE prepolymer, generally, a relatively small fraction of the available secondary amine sites can be subject to cross-linking to form the branched or partially cross-linked polyamidoamine prepolymer. In addition to the molar ratios provided herein, for example, the symmetric cross-linker to prepolymer molar ratios can be selected to provide from 0.01% to 5% of the stoichiometric ratio of cross-linker to prepolymer. In a further aspect, the symmetric cross-linker to prepolymer molar ratios can provide from 0.1% to 4%; alternatively, from 0.2% to 3.5%; alternatively, from 0.3% to 3%; alternatively, from 0.4% to 2.5%; alternatively, from 0.5% to 2%; or alternatively, from 0.6% to 1.5% of the stoichiometric ratio of cross-linker to prepolymer. These values reflect the combined molar amounts when using more than one symmetric cross-linker.

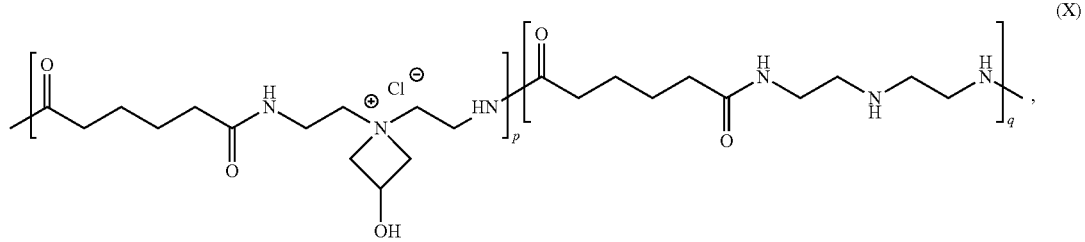
(X)

where $p \geq 2$ the q/p ratio is from about 10 to about 1000, and where the structure includes at least two azetidinium moieties that function to cross-link, and that qualify a structure such as X as a functionally-symmetrical cross-linker. As the q/p ratio indicates, there is a small fraction of azetidinium moieties as compared to acid and amine residues. Moreover, the polyamidoamine X also can have the structure where the q/p ratio is from about 12 to about 500; alternatively, from about 14 to about 400; alternatively, from about 16 to about 300; alternatively, from about 18 to about 200; or alternatively, from about 20 to about 100. One type By way of example, using a polyamidoamine prepolymer derived from adipic acid and diethylenetriamine (DETA) as an example, and cross-linking the prepolymer using methylene-bis-acrylamide (MBA), the partially cross-linked polyamidoamine prepolymer can be illustrated by the following structure:

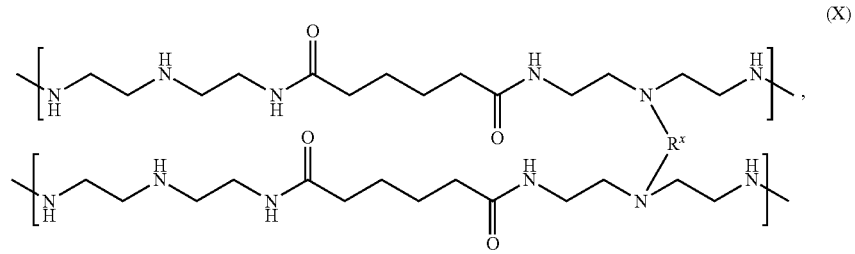
(X)

where the $R^x$ bridging moiety has the structure:

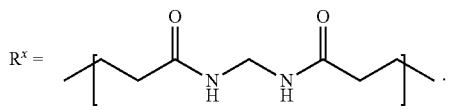

This illustration does not reflect the use of any mono-functional modifiers (infra) in addition to the symmetrical cross-linker.

Mono-Functional Modifier

The secondary amine groups of the polyamine prepolymers can also be reacted with one or more mono-functional compounds to impart any desired chemical functionality to the prepolymer. The mono-functional compounds have a reactive group that can react with secondary or primary amine and a non-reactive part which can be cationic (to increase the cationic charge density), hydrophilic or hydrophobic (to adjust the interaction with non-ionic segments of the cellulose fibers). As desired, the polyamine prepolymer can be reacted with a deficiency of a mono-functional modifier comprising one secondary amine-reactive moiety either before, during, or after, the step of reacting the polyamine prepolymer with a deficiency of the symmetric cross-linker. Further, the reaction with a stoichiometric deficiency of a mono-functional modifier can also be carried using any combination of reaction or addition before, during, or after, reaction with the symmetric cross-linker.

In one embodiment, the mono-functional modifier can be selected from or can include a neutral or cationic acrylate compound, a neutral or cationic acrylamide compound, an acrylonitrile compound, a mono-epoxide compound, or any combination thereof. According to a further aspect, the mono-functional modifier can be selected from or can include an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, and any combination thereof. Examples of mono-functional modifiers are illustrated below.

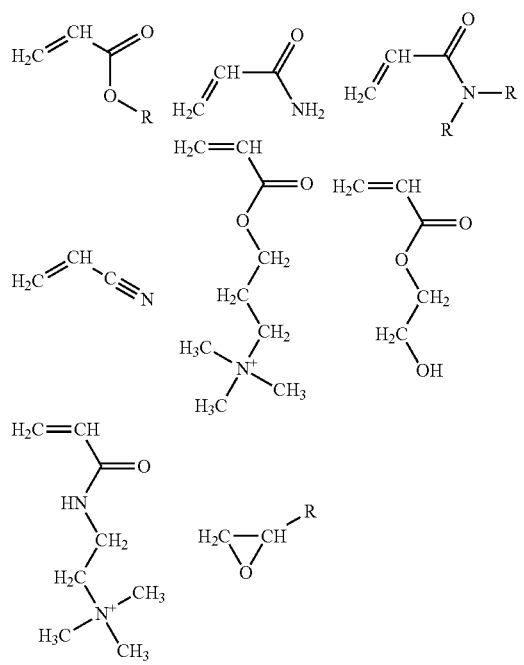

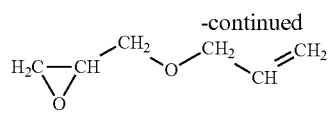

In other embodiments, the mono-functional modifier can be selected from or alternatively can include at least one of: methyl acrylate; alkyl acrylate; acrylamide; N-methylacrylamide; N,N-dimethylacrylamide; acrylonitrile; 2-methyloxirane; 2-ethyloxirane; 2-propyloxirane; 2-(allyloxymethyl)oxirane; 2-hydroxyethyl acrylate; 2-(2-hydroxyethoxy)ethyl acrylate; 2-(acryloyloxy)-N,N,N-trimethylethanaminium; 3-(acryloyloxy)-N,N,N-trimethylpropan-1-aminium; 2-acrylamido-N,N,N-trimethylethanaminium; 3-acrylamido-N,N,N-trimethyl propan-1-aminium; and 1-isopropyl-3-(methacryloyloxy)-1-methylazetidinium chloride. Depending, at least in part, on the structure of the modifier, it can be seen that upon reaction of these compounds with a secondary or primary amine, the portion that is non-reactive toward the amine can impart cationic charge to assist in increasing the cationic charge density, can alter the hydrophilic or hydrophobic characteristics, for example to adjust the interaction with non-ionic segments of the cellulose fibers, and/or can affect other properties of the resulting intermediate cross-linked prepolymer.

Halohydrin-Functionalized Polymer and Intramolecular Cyclization

Generally, by separating into discrete steps the reaction of the polyamine prepolymer with the cross-linkers from the reaction of the intermediate cross-linked prepolymer with the epichlorohydrin, the second reaction step requires less epichlorohydrin than conventional methods to reach the desired end-point. Further, this second reaction step can be effected under reaction conditions that favor optimized azetidinium group formation over further cross-linking. The asymmetric functionality of epichlorohydrin is useful in this functionalization to allow a relatively facile reaction of the epoxy group with secondary amines to form a pendant chlorohydrin moiety, followed by an intramolecularly cyclization of the pendant chlorohydrin to generate a cationic azetidinium functionality. This latter intramolecular cyclization typically utilizes heating of the halohydrin-functionalized polymer.

In one embodiment, the second reaction step can be carried out using any epihalohydrin, such as epichlorohydrin, epibromohydrin, and epiiodohydrin, or any combination thereof. However, epichlorohydrin is typically the most common epihalohydrin used in this reaction step. When reciting epichlorohydrin in this disclosure, such as in structures or reaction schemes, it is understood that any one or any combination of the epihalohydrins can be used in the process.

By way of example, using the partially cross-linked polyamidoamine prepolymer illustrated supra that was derived from adipic acid and DETA and cross-linking using MBA, the epichlorohydrin functionalization product can illustrated by the following structure, termed a "halohydrin-functionalized polymer".

(Y)

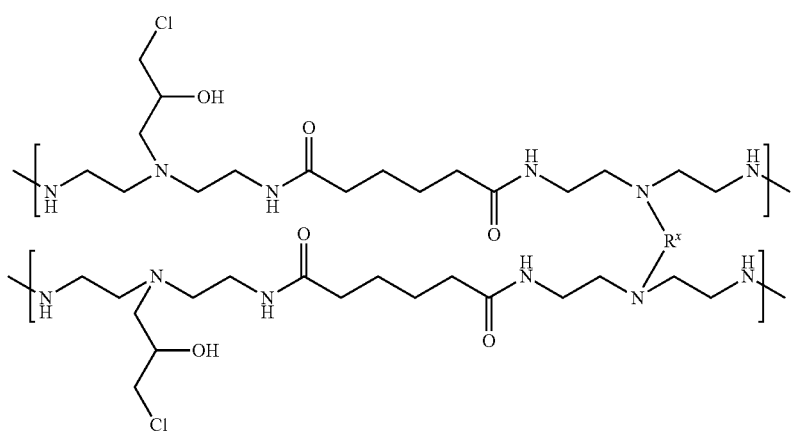

As before, this illustration does not reflect the use of any mono-functional modifiers in addition to the symmetrical cross-linker.

The reaction of epihalohydrins such as epichlorohydrin is generally tailored to consume a high percentage or the remaining secondary amine moieties in generating the halohydrin-functionalized polymer, in this case, a chlorohydrin-functionalized polymer.

The formation of the halohydrin-functionalized polymer can be carried out using a range of epichlorohydrin molar ratios, but this reaction is typically carried out using an excess of epichlorohydrin. The stoichiometric reaction of epichlorohydrin with a secondary amine group requires a 1:1 molar ratio of epichlorohydrin with a secondary amine. In an aspect, from about 0.8 mole to about 3 moles of epichlorohydrin per mole of secondary amine can be used. Alternatively, from about 0.9 mole to about 2.5 moles of epichlorohydrin per mole of secondary amine; alternatively, from about 1.0 mole to about 2.0 moles; alternatively, from about 1.1 mole to about 1.7 moles; alternatively, from about 1.2 mole to about 1.5 moles; alternatively, from about 1.25 mole to about 1.45 moles of epichlorohydrin per mole of secondary amine can be used. For example, the moles of epichlorohydrin per mole of secondary amine can be about 0.8 moles, about 0.9 moles, about 1.0 moles, about 1.1 moles, about 1.2 moles, about 1.3 moles, about 1.4 moles, about 1.5 moles, or about 1.6 moles epichlorohydrin per mole of secondary amine.

A further aspect of the process can be that sufficient amounts of symmetric cross-linker and epihalohydrin can be employed such that the resin composition prepared by the process can include substantially no secondary amine groups. This result can be effected by using the molar amounts and ratios disclosed herein, but resin compositions prepared by this disclosure can include substantially no secondary amine groups even when molar amounts and ratios outside those recited may be used. By substantially no secondary amine groups, it is intended that less than 10% of the original secondary amines in the starting PAE resin prior to it cross-linking, functionalization, and cationization reactions remain. Alternatively, less than 5%; alternatively, less than 2%; alternatively, less than 1%; alternatively, less than 0.5%; alternatively, less than 0.2%; alternatively, less than 0.1%; alternatively, less than 0.01%; alternatively, less than 0.005%; or alternatively, less than 0.001% of the original secondary amines in the starting PAE resin remain.

The halohydrin (typically chlorohydrin)-functionalized polymer can be converted to the wet-strength resin composition by subjecting it to cyclization conditions to form azetidinium ions. This step can include heating the chlorohydrin-functionalized polymer. In contrast to the conventional method in which heating induces both cross-linking and cyclization, the cross-linking portion of this process is complete when the cyclization is carried out, thereby affording greater process control and the ability to more closely tailor the desired properties of the resulting resin. Also in contrast to the conventional method, the process of this disclosure reduces and/or minimizes the formation of the epichlorohydrin by-products 1,3-dichloro-2-propanol (1,3-DCP or "DCP") and 3-chloropropane-1,2-diol (3-CPD or "CPD") remaining in the resin can be reduced or minimized.

According to one aspect of the disclosure, the concentration of epichlorohydrin 1,3-dichloro-2-propanol (1,3-DCP) remaining in the wet strength resin at 25% solids (DCP @ 25%) can be less than about 15,000 ppm; alternatively, less than about 14,000 ppm; alternatively, less than about 13,000 ppm; alternatively, less than about 12,000 ppm; alternatively, less than about 11,500 ppm; alternatively, less than about 11,000 ppm; alternatively, less than about 10,500 ppm; alternatively, less than about 10,000 ppm; alternatively, less than about 8,000 ppm; alternatively, less than about 6,000 ppm; or alternatively, less than about 5,000 ppm.

The following resin structure Z illustrates the result of the cyclization step to form the quaternary nitrogen ("cationization") based on the chlorohydrin-functionalized polymer Y shown supra, which has been subjected to conditions sufficient to intramolecularly cyclize the pendant chlorohydrin to impart azetidinium functionality.

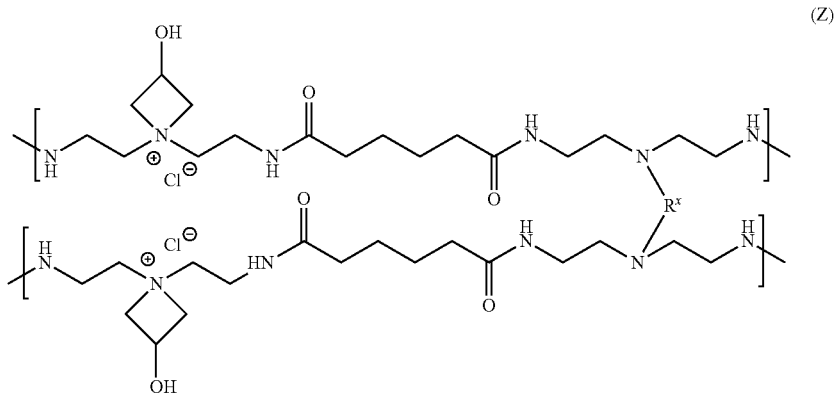

(Z)

In the process for forming the new, non-conventional PAE resin, the PAE resin is generated by subjecting the halohydrin-functionalized polymer to cyclization conditions sufficient to convert the halohydrin groups to form azetidinium ions. In one aspect, at least a portion of the halohydrin groups can be cyclized to form azetidinium ions. According to a further aspect, at least 90% of the halohydrin groups can be cyclized to form azetidinium ions. Alternatively, at least 95%; alternatively, at least 97%; alternatively, at least 98%; alternatively, at least 98.5%; alternatively, at least 99%; alternatively, at least 99.5%; alternatively, at least 99.7%; alternatively, at least 99.8%; or alternatively, at least 99.9% of the halohydrin groups can be cyclized to form azetidinium ions. In another aspect, about 90% or more, about 91% or more, about 92% or more, about 93% or more, about 94% or more, about 95% or more, about 96% or more, about 97% or more, about 98% or more, about 99% or more, about 99.3% or more, about 99.5% or more, about 99.7% or more, about 99.9% or more of the halohydrin groups can be cyclized to form azetidinium ions.

The amount of the halohydrin groups cyclized to form azetidinium ions can be measured via titration with silver nitrate. More particularly, the total chlorine content for a first sample of a PAE resin can be measured by refluxing in the presence of potassium hydroxide to convert all covalently-bound chlorine to chloride ion, neutralizing with nitric acid, and titrating with a silver nitrate solution. The total chlorine is therefore the sum of covalently-bound chlorine and ionic chloride. The amount of the ionic chloride is measured on a second sample of the PAE resin, which does not involve refluxing in the presence of the potassium hydroxide. The total amount of chlorine minus the amount of ionic chloride is the amount of chlorine (halohydrin groups) that can be cyclized to form azetidinium ions.

Additional steps in the new, non-conventional PAE resin processing can be used, for example, to adjust the solids content of the PAE resin, beyond those described in detail above. For example, the resin can be generated by converting the halohydrin-functionalized polymer to an azetidinium functionalized polymer. Following this step, the polymer composition can be adjusted by pH such that the pH of the resin can be from about pH 2 to about pH 4.5. Alternatively, the pH of the resin can be from about pH 2.2 to about pH 4.2; alternatively, from about pH 2.5 to about pH 4; or alternatively, from about pH 2.7 to about pH 3.7. This pH adjustment step also may be followed by the step of adjusting the solids content of the composition from about 10% to about 50% to form the wet strength resin. Alternatively, the solids content of the resin can be adjusted from about 15% to about 40% or alternatively from about 20% to about 30% to form the polyamidoamine-epihalohydrin resin. In one aspect, the polyamidoamine-epihalohydrin resin can have a solids content of about 25%.

The polyamidoamine-epihalohydrin resin can have a charge density that is enhanced over that of conventional resins. For example, the PAE resin can have a charge density of about 2 to about 4 mEq/g of solids. Alternatively, the PAE resin can have a charge density from about 2.25 to about 3.5 mEq/g of solids; alternatively, from about 2.3 to about 3.35 mEq/g of solids; alternatively, from about 2.4 to about 3.2 mEq/g of solids; or alternatively, from about 2.5 to about 3.0 mEq/g of solids. The charge density of the polyamidoamine-epihalohydrin resin can be measured via streaming electrode potential using a Mutek PCD titrator.

The polyamidoamine-epihalohydrin resin can also have a ratio of azetidinium ions to amide residues in the PAE resin, which can be abbreviated by "Azet ratio," from about 0.4 to about 1.3. The Azet ratio also can be from about 0.5 to about 1.15; alternatively, from about 0.6 to about 1.0; or alternatively, from about 0.7 to about 0.9. In a further aspect, the ratio of azetidinium ions to secondary amine moieties in the resin can be from about 0.4 to about 1.0. The Azet ratio can be measured by quantitative $^{13}$C NMR by comparing the methylene carbons of the azetidinium versus the methylenes of the acid residue in the backbone.

In another aspect, the polyamidoamine-epihalohydrin resin can have a weight average molecular weight (Mw) from about $0.02 \times 10^6$ to about $3.0 \times 10^6$. Alternatively, the resins that can have a Mw molecular weight from about $0.05 \times 10^6$ to about $2.5 \times 10^6$; alternatively, from about $0.1 \times 10^6$ to about $2.0 \times 10^6$; alternatively, from about $0.5 \times 10^6$ to about $1.5 \times 10^6$; or alternatively, from about $1 \times 10^6$ to about $1.0 \times 10^6$. In further embodiments, the resin that can have a Mw molecular weight from about $0.05 \times 10^6$ to about $1.7 \times 10^6$. The Mw molecular weight also can be from about $0.6 \times 10^6$ to about $1.6 \times 10^6$; alternatively, from about $0.7 \times 10^6$ to about $1.5 \times 10^6$; alternatively, from about $0.8 \times 10^6$ to about $1.3 \times 10^6$; or alternatively, from about $0.9 \times 10^6$ to about $1.1 \times 10^6$.

In a further aspect the polyamidoamine-epihalohydrin resin can have an azetidinium equivalent weight, defined as the degree of polymerization multiplied times the Azet ratio, or (degree of polymerization)×(Azet), of from about 1,600 to about 3,800. Alternatively, the azetidinium equivalent weight can be from 1,800 to about 3,500, or alternatively, from about 2,000 to about 2,900.

One or more urea-formaldehyde (UF) resins can be used as resins for the resin system. A variety of techniques are known in the art for making urea-formaldehyde (UF) resins can be employed. The urea-formaldehyde resin can be prepared from urea and formaldehyde monomers and/or from UF precondensates in manners known to those of skill in the art. For example, any of the wide variety of procedures used for reacting urea and formaldehyde monomers to form a UF resin can be used, such as staged monomer addition, staged catalyst addition, pH control, amine modification and the like. The urea and formaldehyde monomers can be reacted in an aqueous solution under alkaline conditions using known techniques and equipment.

Formaldehyde for making a suitable UF resin is available in many forms. Formaldehyde suitable for making a PF resin can be available in many forms. The formaldehyde can be supplied as an aqueous solution known in the art as "formalin." Formalin can contain from about 37% to about 50% by weight formaldehyde. Other forms of formaldehyde such as paraformaldehyde also can be used. Other aldehydes can be used in lieu of or in combination with formaldehyde. For example, suitable aldehydes that can be used in lieu of or in combination with formaldehyde can include, but are not limited to, aliphatic aldehydes such as acetaldehyde and propionaldehyde, aromatic aldehydes such as benzylaldehyde and furfural, glyoxal, crotonaldehyde, or any combination thereof.

Other aldehyde monomers can be used in lieu of or in combination with formaldehyde for making resins. The aldehyde monomers can include any suitable aldehyde or combination of aldehydes. The aldehyde monomers can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. Preferably, the aldehyde monomer can be formaldehyde.

As discussed above, urea is available in many forms that can be used to make a resin. Solid urea, such as prill, and urea solutions, such as aqueous solutions, can be used. Any form of urea or urea in combination with formaldehyde can be uses. Both urea prill and combined urea-formaldehyde products can be preferred, such as Urea-Formaldehyde Concentrate or UFC 85. These types of products can be as discussed and described in, for example, U.S. Pat. Nos. 5,362,842 and 5,389,716.

The urea-formaldehyde resin can be made using a molar excess of formaldehyde. When synthesized, such resins contain a low level of residual "free" urea and a much larger amount of residual "free," i.e., unreacted, formaldehyde. Prior to any formaldehyde scavenging, the urea-formaldehyde resin can be characterized by a free formaldehyde content from about 0.2 wt % to about 18 wt % of the aqueous urea-formaldehyde resin. For example, the urea-formaldehyde resin can have a concentration of free formaldehyde from a low of about 0.1 wt %, about 0.5 wt %, about 1 wt %, or about 2 wt % to a high of about 6 wt %, about 12 wt %, or about 18 wt %, based on the total weight of the urea-formaldehyde resin.

The urea-formaldehyde resin can have a molar ratio of formaldehyde to urea (F:U) from a low of about 0.3:1, about 0.9:1, or about 1.5:1 to a high of about 3:1, about 4:1, about 5:1, or about 6:1. For example, the urea-formaldehyde resin can have a molar ratio of formaldehyde to urea from about 0.5:1 to about 0.1.2:1, about 1.3:1 to about 2:1, about 2:1 to about 3:1, about 1.1:1 to about 3:1, about 4:1 to about 5:1, or about 5:1 to about 6:1. In other example, the urea-formaldehyde resin can have a molar ratio of formaldehyde to urea from about 0.7:1 to about 2.7:1, about 0.9:1 to about 1.3:1, about 1:1 to about 2.4:1, about 1.1:1 to about 2.6:1, or about 1.3:1 to about 2:1. In another example, the urea-formaldehyde resin can have a molar ratio of formaldehyde to urea from about 0.25:2.5 to about 1.5:2.5.

The urea-formaldehyde resin can have a weight average molecular weight from a low of about 200, about 300, or about 400 to a high of about 1,000, about 2,000, about 14,000, about 25,000, about 50,000, about 100,000 or about 500,000. In another example, the urea-formaldehyde resin can have a weight average molecular weight from about 250 to about 450, about 450 to about 550, about 550 to about 950, about 950 to about 1,500, about 1,500 to about 2,500, or about 2,500 to about 6,000. In another example, urea-formaldehyde resin can have a weight average molecular weight of about 175 to about 800, about 700 to about 3,330, about 1,100 to about 4,200, about 230 to about 550, about 425 to about 875, or about 475 to about 775. In other example, urea-formaldehyde resin can have a weight average molecular weight of about 10,000 to about 100,000, about 12,000 to about 250,000, or about 14,000 to about 500,000.

The reaction can be conducted in an aqueous solution. The reaction can be conducted so that the resulting urea-formaldehyde resin has a solids content of at least about 20 wt %, at least about 30 wt %, at least about 35 wt %, or at least about 45 wt %, based on the weight of the UF resin solution. The solids content can range from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the weight of the UF resin solution. For example, UF resin solutions can have a non-volatile material or solids content from about 40 wt % and about 48 wt %, about 40 wt % and about 44 wt %, about 45 wt % and about 65 wt %, or about 50 wt % and about 60 wt %, based on the weight of the UF resin solution.

The viscosity of the urea-formaldehyde resin can widely vary. For example, the viscosity of the urea-formaldehyde resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the urea-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the urea-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31.

The urea-formaldehyde resin can have pH from a low of about 1, about 2, about 3, about 4, about 5, about 6, about 7 to a high of about 8, about 9, about 10, about 11, about 12, or about 13. In another example, urea-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

The UF resin can also include additives such as ammonia, alkanolamines, or polyamines, such as an alkyl primary diamine, e.g., ethylenediamine (EDA). Other additives, such as melamine, ethylene ureas, and primary, secondary and tertiary amines, for example, dicyanodiamide, can also be incorporated into UF resins. Concentrations of these additives in the reaction mixture often will vary from about 0.05 to about 20.0% by weight of the UF resin solids. These types of additives can promote hydrolysis resistance, polymer flexibility and lower formaldehyde emissions in the cured resin. Further urea additions for purposes of scavenging formaldehyde or as a diluent also can be used. Urea-formaldehyde resins can also have a water dilutability of about 1:1 to about 100:1, preferably about 5:1 and above.

The additives can be other monomers and/or polymers such as styrene acrylic acid or styrene acrylate, an adduct of styrene, maleic anhydride, and an acrylic acid or acrylate, or a mixture of a styrene acrylic acid or styrene-acrylate copolymer and a styrene-maleic anhydride copolymer. The additive can be added to the UF resin or can be formed in situ by mixing the styrene-maleic anhydride and an acrylate monomer with the UF resin.

The additive can be prepared by combining styrene, maleic anhydride, and an acrylate or acrylic acid in amounts to form a terpolymer. The amount of styrene can be about 50% to about 85%, preferably about 70%. The amount of maleic anhydride can be about 15% to about 50%, preferably about 25%. The amount of an acrylate or acrylic acid can be about 1 to about 20%, preferably about 5%.

The constituents of the terpolymer can be dissolved in a suitable solution such as an aqueous solution of sodium hydroxide, ammonium hydroxide, potassium hydroxide, or any combination thereof. Preferably about 1-5% of the terpolymer constituents can be dissolved in the aqueous solution. The solution can be heated from about 70° C. to about 90° C., and held until the terpolymer is in solution. The solution can then be added to a urea-formaldehyde resin.

Alternatively the acrylic acid or acrylate can be combined with styrene maleic anhydride in situ with the urea-formaldehyde resin. The result can be a styrene maleic anhydride methylmethacrylate terpolymer. Any suitable acrylic acid or acrylate can be used such as methyl methacrylate, butyl acrylate, or methacrylate. Preferably, the acrylate is methyl methacrylate (MMA). Styrene-maleic anhydride (SMA) copolymers can be used. Suitable SMA copolymers can be as discussed and described in U.S. Pat. No. 5,914,365.

The additive can make up about 0.1 wt % to about 10 wt %, preferably about 0.5 wt % to about 5 wt % of the undiluted resin solids. The total concentration of non-volatile materials in the aqueous resin composition (predominantly UF resin and additive solids) can vary widely. The total solids concentration can be about 5 wt % to about 40 wt %, based on the total weight of the resin composition. Preferably the total solids can be from about 20 wt % to about 35 wt %, more preferably from about 20 wt % to about 30 wt %.

Many urea-formaldehyde resins that can be used are commercially available. One particularly useful class of UF resins for use in preparing resin systems can include those discussed and described in U.S. Pat. No. 5,362,842. Urea-formaldehyde resins such as the types sold by Georgia Pacific Chemicals LLC (e.g. GP® 2928 and GP® 2980) can be used.

Resin systems and methods for making and using same are provided. In one embodiment, the resin system can include a first resin, a second resin and pulp fibers. The first resin can be or include one or more polyamidoamine-epichlorohydrin (PAE) resins or one or more urea-formaldehyde (UF) resins. The second resin can be or include one or more polyamidoamine-epichlorohydrin (PAE) resins or one or more urea-formaldehyde (UF) resins. The first resin can be present in an amount of about 1 wt % to about 99 wt %, based on the total weight the resin system. The second resin can be present in an amount of about 1 wt % to about 99 wt %, based on the total weight the resin system. The first resin or the second resin can be added sequentially or simultaneously to the pulp fibers, where the period for sequential addition between the resins is from about 1 second to about 1 hour. Such resin systems can be used to enhance the strength of paper, particularly the wet strength of paper.

In some embodiments, a process of preparing a paper product can include contacting a plurality of pulp fibers with a resin system. The resin system can include a first resin and second resin. The first resin can be a polyamidoamine-epichlorohydrin (PAE) resin or a urea-formaldehyde (UF) resin. The second resin can be polyamidoamine-epichlorohydrin (PAE) resin or a urea-formaldehyde (UF) resin. The first resin can be present in an amount of about 1 wt % to about 99 wt %, based on the total weight the resin system. The second resin can be present in an amount of about 1 wt % to about 99 wt %, based on the total weight the resin system. The process can also include adding the first resin or the second resin sequentially or simultaneously to the pulp fibers to produce a paper product, where the period for sequential addition between the resins is from about 1 second to about 1 hour.

A catalyst or cure accelerator can be added to the resin system in order to aid in the curing process. Suitable catalysts can include, but are not limited to, inorganic acids, organic acids (and anhydrides thereof), or any combination thereof. Illustrative inorganic acids can include, but are not limited to, sulfuric acid, hydrochloric acid, phosphoric acid, boric acid, or any combination thereof. Illustrative organic acids and anhydrides can include, but are not limited to, acetic acid, tartaric acid, benzoic acid, propionic acid, adipic acid, oxalic acid, fumaric acid, hexachloric phthalic anhydride, maleic anhydride, or any combination thereof. Other catalysts which can be employed can include compounds that can liberate an acid when heated. Such catalysts can include the amine salts of organic and inorganic acids, such as ethylene sulfite, the hydrochloric acid salt of 2-amino-2-methyl propanol, the hydrochloric acid salt of mono-, di-, or triethanol amine, the hydrochloric acid salt of 2-dimethyl-amino-2-methyl propanol, the amine salts of para-toluene sulfonic acid, the chloroacetic acid salt of pyridine, the triammonium acid pyrophosphate salt of aminomethyl propanol, and the phosphoric acid salt of 2-dimethylamino-2-methyl propanol. Other catalysts include the inorganic salts of inorganic acids, such as ammonium chloride, magnesium chloride, zinc chloride, or any combination thereof. The catalyst system can also include mixtures of the aforementioned catalysts.

Catalysts can be added in an amount from about 0.1 wt % to 10 wt %, preferably about 0.1 wt % to 1.5 wt % and, most preferably, about 0.2 wt %, based on the resin solids.

As used herein, the terms "curing," "cured," and similar terms are intended to embrace the structural and/or morphological change that occurs in a the resin system, such as by covalent chemical reaction (crosslinking), ionic interaction or clustering, improved adhesion to the substrate, phase transformation or inversion, and/or hydrogen bonding when the resin system can be at least partially cured to cause the properties of a flexible, pulp fibers, to which an effective amount of the resin system has been applied.

In other embodiment, a process of treating paper to impart wet strength can include contacting a plurality of paper with a resin system. The resin system can include a first resin and a second resin. The first resin can be a polyamidoamine-epichlorohydrin (PAE) resin or a urea-formaldehyde (UF) resin. The second resin can be a polyamidoamine-epichlorohydrin (PAE) resin or a urea-formaldehyde (UF) resin. The first resin can be present in an amount of about 1 wt % to about 99 wt %, based on the total weight the resin system. The second resin can be present in an amount of about 1 wt % to about 99 wt %, based on the total weight the resin system. The process can also include adding the first resin or the second resin sequentially or simultaneously to the pulp fibers, where the period for sequential addition between the resins is from about 1 second to about 1 hour. The process can also include at least partially curing the resin system.

If the first resin and the second resin are sequentially added to the pulp fibers the period for sequential addition between the resin can be from a low of about 1 second, about 5 seconds, about 10 seconds, about 20 seconds, about 30 seconds, about 45 seconds, about 1 minute, about 2 minutes, about 3 minutes, about 4 minutes, about 5 minutes or about 10 minutes to a high of about 20 minutes, about 30 minutes, about 40 minutes, about 50 minutes, or about 60 minutes. For example, the second resin can be added to the mixture of the first resin and the pulp fibers about 1 second to about 1 hour, about 1 minute to about 5 minutes, about 3 minutes to about 10 minutes, about 5 minutes to about 20 minutes, about 15 minutes to about 30 minutes, about 25 minutes to about 45 minutes, or about 30 minutes to about 60 minutes after the first resin was added to the pulp fibers. In another example, the second resin can be added to the mixture of the first resin and the pulp fibers at least 1 second, at least 5 seconds, at least 10 seconds, at least 20 seconds, at least 30 seconds, at least 45 seconds, at least 1 minute, at least 2 minutes, at least 3 minutes, at least 4 minutes, at least 5 minutes, at least 10 minutes, at least 20 minutes, at least 30 minutes, at least 40 minutes, at least 50 minutes and up to about 1 hour, about 1.5 hours, about 2 hours, or about 3 hours after the first resin was added to the pulp fibers.

In at least one embodiment, the first resin can be or include a polyamidoamine-epihalohydrin resin and the second resin can be or include a urea-formaldehyde resin and the first and second resins can be added to the plurality of pulp fibers sequentially with respect to one another. For example, the first resin that can include the polyamidoamine-epihalohydrin resin can be added to the pulp fibers to form a first or intermediate mixture. The second resin that can include the urea-formaldehyde resin can be added to the first or intermediate mixture to produce a paper product. The first and second resins can be at least partially cured. In at least one other embodiment, the first resin can be or include a urea-formaldehyde resin and the second resin can be or include a polyamidoamine-epihalohydrin resin and the first and second resins can be added to the plurality of pulp fibers sequentially with respect to one another. For example, the first resin that can include the urea-formaldehyde resin can be added to the pulp fibers to form a first or intermediate mixture. The second resin that can include the polyamidoamine-epihalohydrin resin can be added to the first or intermediate mixture to produce a paper product. The first and second resins can be at least partially cured.

In another embodiment, a paper product can include a plurality of pulp fibers and an at least partially cured resin system, where the resin system, prior to curing, includes a first resin and second resin. The first resin can be a polyamidoamine-epichlorohydrin (PAE) resin or a urea-formaldehyde (UF) resin. The second resin can be polyamidoamine-epichlorohydrin (PAE) resin or a urea-formaldehyde (UF) resin. The first resin can be present in an amount of about 1 wt % to about 99 wt %, based on the total weight the resin system. The second resin can be present in an amount of about 1 wt % to about 99 wt %, based on the total weight the resin system. The first resin or the second resin is added sequentially or simultaneously to the pulp fibers, where the period for sequential addition between the resins is from about 1 second to about 1 hour.

The resin systems can be used as adhesives for bonding pulp fibers to make paper products. Illustrative paper products produced using the resin systems discussed and described herein can include, but are not limited to, paperboard, tissue, towel, liquid packaging, and the like. In one or more embodiments, the PAE resin can scavenge at least some of the free formaldehyde. In one or more embodiments, a blend or mixture of the PAE resin and a UF resin can reduce the formaldehyde emission by dilution and/or chemical reaction.

EXAMPLES

In order to provide a better understanding of the foregoing discussion, the following non-limiting examples are offered. Although the examples can be directed to specific embodiments, they are not to be viewed as limiting the invention in any specific respect. Unless otherwise specified, reagents were obtained from commercial sources. The following analytical methods were used to characterize the resins.

Example 1: Preparation of Polyamidoamine-Epihalohydrin (PAE) Resin 1

Step 1: To a reaction vessel equipped with an agitator and a reflux condenser was added 218 g of diethylenetriamine. To this was added slowly over 45 minutes 318 grams of solid adipic acid. As the adipic acid was added the reaction temperature climbed steadily from ambient to 140 C, at which point the temperature remained constant. Upon completion of the adipic acid addition, the reaction mixture was then heated to 155° C., at which point reflux began. The reflux condenser was reconfigured for distillation, and water was distilled from the reactor into a collection vessel. During the distillation, the reaction temperature was slowly ramped up to a maximum of 165° C. Distillation was continued at 165° C. until a sample of the reaction mixture, removed from the reactor and diluted to 45% solids, reached a Gardner-Holdt viscosity of L. The distillation condenser was reconfigured for reflux and 350 grams of water was added slowly through the reflux condenser, to carefully reduce the reaction temperature to approximately 95° C. while diluting the reaction mixture. Additional water was then added to adjust the reaction mixture to 45% total solids. The resulting polyamidoamine solution had a Brookfield viscosity of 300 cP at 45% solids.

Step 2: To 359 gram of the above polyamidoamine solution was added about 25 gram of water. Then, 92 gram of epichlorohydrin was gradually added over 75 minutes under vigorous agitation. The mixture temperature was controlled below 25° C. while epichlorohydrin was being added. As the addition of epichlorohydrin was complete, the mixture then was heated to 30° C. and was maintained at the same temperature for 30 minutes. Then 387 gram of water to the mixture was added and heated to about 60° C. When the Gardner-Holdt viscosity of the mixture increased to B, the reaction mixture was cooled to 55° C. in order to slow down the reaction rate. The reaction continuously advanced to the Gardner-Holdt viscosity of EF, then was cooled to 50° C. The reaction mixture was maintained at 50° C. until it had obtained a viscosity of KL. To the resulting solution was added about 29.3 gram of an acid mixture containing formic acid and sulfuric acid in a blend ratio of 1.19 to 1 and having an acid concentration of 52% by weight. As above, the dilution water of 125 gram was added to achieve the target RI of 1.3826. The final aqueous polyamidoamine-epichlorohydrin resin resulting solution was obtained by adjusting resin pH to 2.85 using the blend of sulfuric and formic acids. The final resin has a solids concentration of 25.04 wt. %, cationic charge of 2.09 meq/gram, a pH of 3.0 and a viscosity of 172 cP at 25° C.

Example 2: Preparation of
Polyamidoamine-Epihalohydrin (PAE) Resin 2

Step 1: A glass reactor with a 5-neck top was equipped with a stainless steel stirring shaft, a reflux condenser, temperature probe, and a hot oil bath was provided. To the reactor was added 500.5 grams of DETA (diethylenetriamine). The stirrer was turned on and 730 grams of adipic acid was added slowly to the reactor over 45 minutes with stirring. The reaction temperature increased from 25° C. to 145° C. during adipic acid addition. After the adipic acid addition was complete, the reactor was immersed in a hot oil bath heated to 160° C. At 150° C. the reaction mixture began to reflux. The reflux condenser was reconfigured for distillation, and distillate was collected in a separate receiver. The reaction mixture was sampled at 30 minute intervals. Each sample was diluted to 45% solids with water, and the viscosity was measured with Brookfield viscometer. When the sample reached 290 cP the distillation condenser was reconfigured to reflux. Water was added slowly to the reaction mixture through the reflux condenser to dilute and cool the reaction. Water was added to obtain a final solids of 45%. The viscosity was 290 cP.

Step 2: A glass reactor with 5-neck top was equipped with a glass stirring shaft and Teflon paddle, an equal pressure addition funnel, temperature and pH probe, stainless steel cooling coils, sample valve, and heating mantle. To the reactor was added 1,000 grams of Polyamidoamine Prepolymer prepared in step 1. The stirrer was started and the prepolymer was heated to 40° C. N,N-Methylene-bis-acrylamide, 15.16 grams (Pfaltz & Bauer, Inc), was added slowly while the reaction mixture was heated to 60° C. The reaction mixture then was held at 60° C. for about 2 hours, and the viscosity advanced to 4,630 cP (Brookfield-SSA), at which point the viscosity advancement stopped. The reaction was cooled to 25° C. The intermediate (partially cross-linked) prepolymer was isolated and stored.

Step 3: To the reactor configured as described in Step 2 was added 366.04 grams of intermediate (partially cross-linked) prepolymer from Step 2 above. The reaction temperature was adjusted to 25° C. and 120.13 grams of water was added. The viscosity of the reaction mixture was 837 cP. To the intermediate partially cross-linked prepolymer was added 77.89 grams of epichlorohydrin at 25° C. over 90 minutes. 428.19 Grams of water was added to the reaction mixture. The reaction was held at 25° C. for 18 hours while sampling periodically for $^{13}$C NMR analysis. During this time the viscosity of the reaction increased from 18 cP to 319 cP (Brookfield-SSA). This reaction was treated with concentrated sulfuric acid to adjust the pH to 2.94. The reaction mixture was adjusted to 25.0% solids, and the viscosity was 335 cP.

Example 3: Preparation of
Polyamidoamine-Epihalohydrin (PAE) Resin 3

Step 1: A glass reactor with a 5-neck top was equipped with a stainless steel stirring shaft, a reflux condenser, temperature probe, and a hot oil bath was provided. To the reactor was added 1,574.5 grams DBE-5 (glutaric acid dimethyl ester, or dibasic ester). The stirrer was turned on and 1,038.9 grams of DETA was added to the reactor with stirring. The reactor was immersed in a hot oil bath heated to 100° C. At 90° C. the reaction mixture began to reflux. The reflux condenser was reconfigured for distillation and distillate was collected in a separate receiver. The reaction mixture was sampled at 30 minute intervals. Each sample was diluted to 45% solids with water, and the viscosity was measured with Brookfield viscometer. When the sample reached 220 cP the distillation condenser was reconfigured to reflux. Water was added slowly to the reaction mixture through the reflux condenser to dilute and cool the reaction. Water was added to obtain a final solids of 45%. The viscosity was 220 cP.

Step 2: A glass reactor with 5-neck top was equipped with a glass stirring shaft and Teflon paddle, an equal pressure addition funnel, temperature and pH probe, stainless steel cooling coils, sample valve, and heating mantle. To the reactor was added 445.64 grams of Polyamidoamine Prepolymer from step 1. Water, 5.25 grams was added and the stirrer was started. The reaction mixture was heated to 35° C. and 2.028 grams of N, N-methylene-bis-acrylamide (Pfaltz & Bauer, Inc.) was added. The reaction mixture was heated to 60° C. and held at that temperature for 4 hours. The viscosity of the reaction mixture advanced to 384 cP (Brookfield-SSA). The intermediate (partially cross-linked) prepolymer mixture was utilized in-situ in the following Step 3.

Step 3: The reaction temperature of the intermediate prepolymer mixture from Step 2 was adjusted to 25° C., and 88.46 grams of water was added. The reaction temperature was then adjusted to 21° C. and 121.21 grams of epichlorohydrin was added over 75 minutes. This reaction mixture was allowed to warm to 25° C. over 45 minutes and 446.27 grams of water was added. This reaction mixture was heated to 45° C., and after 2 hours was heated to 55° C. After about 4 hours, a mixture of formic acid and sulfuric acid was added to adjust the pH to 2.87. (Generally, the pH can be adjusted using any organic acid, mineral acid, or combination thereof, for example, acetic acid, formic acid, hydrochloric acid, phosphoric acid, sulfuric acid, or any combination thereof.) The reaction mixture then was cooled to 25° C., and water was added to adjust the solids to 25.0%. The viscosity of the resultant wet strength resin was 187 cP.

Example 4: Preparation of Polyamidoamine-Epihalohydrin (PAE) Resin 4

Step 1: A glass reactor with a 5-neck top was equipped with a stainless steel stirring shaft, a reflux condenser, temperature probe, and a hot oil bath was provided. To the reactor was added 1,574.5 grams DBE-5 (glutaric acid dimethyl ester, or dibasic ester). The stirrer was turned on and 1,038.9 grams of DETA was added to the reactor with stirring. The reactor was immersed in a hot oil bath heated to 100° C. At 90° C. the reaction mixture began to reflux. The reflux condenser was reconfigured for distillation and distillate was collected in a separate receiver. The reaction mixture was sampled at 30 minute intervals. Each sample was diluted to 45% solids with water, and the viscosity was measured with Brookfield viscometer. When the sample reached 220 cP the distillation condenser was reconfigured to reflux. Water was added slowly to the reaction mixture through the reflux condenser to dilute and cool the reaction. Water was added to obtain a final solids of 45%. The viscosity was 220 cP.

Step 2: A glass reactor with 5-neck top was equipped with a glass stirring shaft and Teflon paddle, an equal pressure addition funnel, temperature and pH probe, stainless steel cooling coils, sample valve, and heating mantle. To the reactor was added 449.10 grams of Polyamidoamine Prepolymer from Step 1. The stirrer was started, the reaction mixture was heated to 30° C., and 6.92 grams of poly (propylene glycol) diglycidyl ether (Polystar) was added over 1 hour. The reaction mixture held at 30° C. for 1 hour and was then heated to 60° C., at which point the viscosity was 416 cP. The reaction mixture was heated at 60° C. for about 4 hours, and the viscosity advanced to 542 cP (Brookfield-SSA). The intermediate cross-linked prepolymer was utilized in-situ in Step 3 that follows.

Step 3: The reaction temperature of the intermediate prepolymer mixture from Step 2 was adjusted to 25° C., and 80.10 grams of water was added. To the reactor was added 118.79 grams of epichlorohydrin over 75 minutes. The reaction was allowed to warm to 30° C. over 45 minutes, and 431.35 grams of water was added. The reaction was warmed to 45° C. over 45 minutes and after 2 hours was heated to 50° C. After about 3.5 hours the viscosity of the reaction was about 320 cP (Gardner-Holdt bubble tube), and then a mixture of formic acid and sulfuric acid was added to adjust the pH to 3.00. The reaction mixture was cooled to 25° C. and water was added to adjust the solids to 25.0%. The viscosity of the resultant wet strength resin was 219 cP.

Example 5: Preparation of Urea-Formaldehyde (UF) Resin

A 4 liter glass reactor with a 5-neck top was equipped with a glass stirring shaft and collar, a reflux condenser, a temperature probe, a pH probe, stainless steel cooling coils, a vacuum sample tube, and a heating mantle. To the reactor was added 852.4 grams of 50% formaldehyde. The stirrer was turned on and 441.2 grams of water was added. The pH of the mixture was adjusted with about 0.33 grams of 50% sodium hydroxide to pH 8.5. To the reaction mixture 61.3 grams of diethylenetriamine was added over a 20 minute period. The resulting exothermic reaction was controlled to 55° C. with cooling coils. About 91 Grams of water was then added to the reaction mixture, and the pH was 9.3. With continued cooling 353.4 grams of urea-prill was added. The reaction temperature was controlled to 62° C. with cooling. The pH of the reaction mixture was 8.5. The reaction was then heated to 80° C. and held at that temperature for 20 minutes, while also keeping the pH at about 8.3 with the addition of sodium hydroxide as needed. After the 20 minute hold period the reaction was treated with 55.7 grams of 18% hydrochloric acid. The reaction was warmed to 83° C. and another 55.7 grams of 18% hydrochloric acid was added. The ensuing exothermic reaction brought the temperature up to about 87° C., and the reaction pH was adjusted to 3.8 with a small amount of 18% hydrochloric acid. The viscosity of the reaction mixture was checked every 10 minutes using Gardner-Holdt bubble tubes. The viscosity of the reaction increased over about 1 hour to a Gardner-Holdt E. Water (281.3 grams) was added to the reaction, and the temperature was adjusted to 71° C. with cooling. Over a 1 hour period the reaction pH was allowed to increase to about pH 4.0 while cooling to 65° C. During this 1 hour period the viscosity of the reaction advanced to a Gardner-Holdt G, while adding small amounts of hydrochloric acid to keep the pH at about 4.0. Once a G Gardner-Holdt was reached 147 grams of water was added and the reaction temperature was controlled to 61° C. The reaction viscosity was monitored every 10 minutes, and the viscosity advanced to a Gardner-Holdt EF over about 30 minutes. At that point 489 grams of water was added and the reaction temperature was cooled to 50° C. Over a 5 minute period 12 grams of sodium hydroxide was added while cooling was continued. To the reaction mixture at that time was added 89.8 grams of urea-prill. The reaction temperature was then adjusted to 45° C. over a 60 minute period. The pH of the reaction was then adjusted to about 6.5 with a small amount of 50% sodium hydroxide, and this was followed by the addition of 143 grams of water. The completed reaction was then cooled to 25° C. and the concentration of the reaction was adjusted to 25% by the addition of water as needed. The final UF resin sample at 25% solids had a pH of 6.5, a Brookfield small sample adapter viscosity of 20 cP. The resin was tested with the sodium sulfite-ice method for free formaldehyde and was found to contain 0.2%.

Example 6: Evaluation of Resin System's Properties and Performance

Handsheets were prepared and tested for physical properties: wet tensile and repulpability. The pulp stock used was an unbleached Kraft obtained from a commercial paperboard machine. The stock freeness was in the range of 390 to 410 CSF. The stock pH was 5.2 through the process. The composition resins were added at 10 lb/ton of pulp solids to a 0.37% consistency diluted stock. When only PAE (polyamidoamine-epichlorohydrin) or UF (urea-formaldehyde) resin was added at 10 lb/ton the resin was added with a one minute mixing time. When the resins were added sequentially, the PAE was added for a one minute mixing time followed by addition of the UF resin for an additional minute. When the resins were added sequentially the combined total was always 10 lb/ton. The treated stock was immediately poured into the headbox of the Noble & Wood handsheet machine containing pH pre-adjusted water (pH of 5.2). The target basis weight was 35 lb/3,000 ft$^2$. Each sheet was passed once @ 20 psi between two blotters through the Adirondack wet press followed by five passes through the Adirondack drum dryer at 240° C. All sets of handsheets were further cured for ten minutes at 105° C. in a forced air oven. The handsheet samples were equilibrated at a constant humidity (50%) and at a constant temperature (73° F.) for twenty-four hours prior to testing. Wet tensile (test specimens immersed in distilled water at 23.0±2° C. under the vacuum level of 21 inch Hg for saturation) were tested to measure improved wet tensile strength performance. Wet tensile measurement method refers to TAPPI Test Method 456 om-10. Repulpability method refers to "Voluntary Standard" For Repulping and Recycling Corrugated Fiberboard Treated to Improve Its Performance in the Presence of Water and Water Vapor" issued by the Fibre Box Association (FBA).

Table 1 illustrates that the resin systems prepared according to this disclosure show significant improvement in actual wet tensile strength and repulpability of paper. The PAE resin used in this Example was PAE Resin 1 discussed in Example 1 above and the UF resin was the UF resin discussed in Example 5 above. Table 1 shows actual and theoretical wet tensile strength and repulpability data for resin addition at ten lb/ton for PAE only, ten lb/ton for UF only, and sequential additions of resins (ten lb/ton total) for percent ratios of 70:30, 50:50 and 30:70 (PAE:UF).

TABLE 1

Properties of resin system (actual wet tensile strength vs. theoretical wet tensile strength & repulpability) via sequential addition of PAE & UF

| PAE Concentration | UF Concentration | Actual Wet Tensile Strength (Lbf/inch) | Theoretical Wet Tensile Strength (Lbf/inch) | Repulpability % Accepts |
|---|---|---|---|---|
| 100 | 0 | 3.45 | | 94 |
| 70 | 30 | 2.89 | 2.89 | 98 |
| 50 | 50 | 2.91 | 2.53 | 99 |
| 30 | 70 | 2.42 | 2.16 | 100 |
| 0 | 100 | 1.61 | | 100 |

The data in Table 1 indicates that above 30% UF (or below 70% PAE) a synergy occurs in that the actual wet tensile is higher than the theoretical value. The repulpability of PAE and UF resin system is at or over 98%. This increase in wet tensile strength was both surprising and unexpected.

Example 7: Evaluation of Resin System's Properties and Performance

Handsheets were prepared and tested for wet tensile. The pulp stock used was an unbleached Kraft obtained from a commercial paperboard machine. The stock freeness was in the range of 420 to 440 CSF. The stock pH was 5.3 through the process. The composition resins were added at ten lb/ton of pulp solids to a 0.45% consistency diluted stock. When only PAE (polyamidoamine) or UF (urea-formaldehyde) resin was added at ten lb/ton the resin was added with a one minute mixing time. When the resins were added sequentially, the PAE was added for a one minute mixing time followed by addition of the UF resin for an additional minute. When the resins were added sequentially the combined total was always ten lb/ton. The treated stock was immediately poured into the headbox of the Noble & Wood handsheet machine containing pH pre-adjusted water (pH of 5.3). The target basis weight was 35 lb/3,000 ft$^2$. Each sheet was passed once @ 20 psi between two blotters through the Adirondack wet press followed by five passes through the Adirondack drum dryer at 240° C. All sets of handsheets were further cured for ten minutes at 105° C. in a forced air oven. The handsheet samples were equilibrated at a constant humidity (50%) and at a constant temperature (73° F.) for twenty-four hours prior to testing. Wet tensile (test specimens immersed in distilled water at 23.0±2° C. under the vacuum level of 21 inch Hg for saturation) were tested to measure improved wet tensile strength performance. Wet tensile measurement method refers to TAPPI Test Method 456 om-10. The following table and graph provides wet tensile data for waterleaf (no resin addition) plus resin addition at ten lb/ton for PAE only, ten lb/ton UF only and sequential additions of resins (ten lb/ton total) for percent ratios of 50:50, 35:65, and 20:80 (PAE:UF).

Table 2 illustrates that the resin systems prepared according to this disclosure show significant improvement in actual wet tensile strength paper. The PAE resin used in this Example was PAE Resin 1 discussed in Example 1 above and the UF resin was the UF resin discussed in Example 5 above. Table 2 shows actual and theoretical wet tensile strength for resin addition at ten lb/ton for PAE only, ten lb/ton for UF only and sequential additions of resins (ten lb/ton total) for percent ratios of 50:50, 35:65 and 20:8 (PAE:UF).

TABLE 2

Properties of resin system (actual wet tensile strength vs. theoretical wet tensile strength) via sequential addition of PAE & UF

| PAE Concentration | UF Concentration | Actual Wet Tensile Strength (Lbf/inch) | Theoretical Wet Tensile Strength (Lbf/inch) |
|---|---|---|---|
| 100 | 0 | 9.31 | |
| 50 | 50 | 7.97 | 6.1 |
| 35 | 65 | 6.27 | 5.14 |
| 20 | 80 | 4.48 | 4.17 |
| 0 | 100 | 2.89 | |

The data shown in Table 2 indicates that above 50% UF (or below 50% PAE) a synergy occurs in that the actual wet tensile is higher than theoretical value. This increase in wet tensile strength was both surprising and unexpected.

It should be noted that the wet tensile strength values for the ten lb/ton for PAE only and the ten lb/ton for UF only shown in Table 2 (Example 7) were quite a bit higher than those shown in Table 1 (Example 6), where ten lb/ton PAE only and ten lb/ton UF only were also used to make the same handsheets. Without wishing to be bound by theory, it is believed that a difference in the furnish between Example 6 and 7 is the reason for the difference in wet tensile strength, which should have produced the same or very similar values. It is speculated that the furnish in Example 6 was somehow contaminated that resulted in the lower wet tensile values.

Example 8: Evaluation of Resin System's Properties and Performance

Handsheets were prepared and tested for wet tensile. The pulp stock used was an unbleached Kraft obtained from a commercial paperboard machine. The stock freeness was in the range of 420 to 440 CSF. The stock pH was 5.3 through the process. The composition resins were added at 5 lb/ton of pulp solids to a 0.45% consistency diluted stock. When only PAE (polyamidoamine) or UF (urea-formaldehyde) resin was added at 5 lb/ton, the resin was added with a one minute mixing time. When the resins were added sequentially, the PAE was added for a one minute mixing time followed by addition of the UF resin for an additional minute. When the resins were added sequentially the combined total was always 5 lb/ton. The treated stock was immediately poured into the headbox of the Noble & Wood handsheet machine containing pH pre-adjusted water (pH of 5.3). The target basis weight was 35 lb/3,000 ft$^2$. Each sheet was passed once @ 20 psi between two blotters through the Adirondack wet press followed by five passes through the Adirondack drum dryer at 240° C. All sets of handsheets were further cured for ten minutes at 105° C. in a forced air oven. The handsheet samples were equilibrated at a constant humidity (50%) and at a constant temperature (73° F.) for twenty-four hours prior to testing. Wet tensile (test specimens immersed in distilled water at 23.0±2° C. under the vacuum level of 21 inch Hg for saturation) were tested to measure improved wet tensile strength performance. Wet tensile measurement method refers to TAPPI Test Method 456 om-10. The following table and graph provides wet tensile data for waterleaf (no resin addition) plus resin addition at five lb/ton for PAE only, five lb/ton UF only and sequential additions of resins (five lb/ton total) for percent ratios of 50:50, 35:65, 20:80 (PAE:UF).

Table 3 illustrates that the resin systems prepared according to this disclosure show significant improvement in actual wet tensile strength of paper. The PAE resin used in this Example was PAE Resin 1 discussed in Example 1 above and the UF resin was the UF resin discussed in Example 5 above. Table 3 shows actual and theoretical wet tensile strength for resin addition at 5 lb/ton for PAE only, 5 lb/ton for UF only, and sequential additions of resins (five lb/ton total) for percent ratios of 50:50, 35:65 and 20:80 (PAE:UF).

TABLE 3

Properties of resin system (actual wet tensile strength vs. theoretical wet tensile strength) via sequential addition of PAE & UF

| PAE Concentration | UF Concentration | Actual Wet Tensile Strength (Lbf/inch) | Theoretical Wet Tensile Strength (Lbf/inch) |
|---|---|---|---|
| 100 | 0 | 7.10 | |
| 50 | 50 | 5.78 | 4.71 |
| 35 | 65 | 4.93 | 3.99 |
| 20 | 80 | 4.63 | 3.27 |
| 0 | 100 | 2.31 | |

The data shown in Table 3 indicates that above 50% UF (or below 50% PAE) a synergy occurs in that the actual wet tensile is higher than theoretical value. This increase in wet tensile strength was both surprising and unexpected.

Embodiments of the present disclosure further relate to any one or more of the following paragraphs:

1. A resin system for enhancing the wet strength of paper comprising: a first resin, wherein: the first resin is present in an amount of about 1 wt % to about 99 wt %, based on the total weight the resin system; and a second resin; wherein the second resin is present in an amount of about 1 wt % to about 99 wt %, based on the total weight the resin system; wherein the first resin or the second resin are added sequentially or simultaneously to the pulp fibers; and wherein the period for sequential addition between the resins is from about 1 second to about 1 hour.

2. The resin system according to paragraph 1, wherein the first resin is a conventional polyamidoamine-epihalohydrin resin or a non-conventional polyamidoamine-epihalohydrin resin.

3. The resin system according to paragraph 2, wherein the non-conventional polyamidoamine-epihalohydrin resin is prepared by the process comprising: a) reacting a polyamine with a symmetric cross-linker to produce a partially cross-linked polyamine; b) adding a epihalohydrin to the partially cross-linked polyamine to produce a halohydrin-functionalized polymer; and c) cyclizing the halohydrin-functionalized polymer to form the resin having azetidinium moieties.

4. The resin system according to paragraph 3, wherein the polyamine has the structure

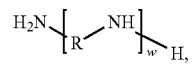

wherein R is alkyl, hydroxyalkyl, amine, amide, aryl, heteroaryl or cycloalkyl and w is an integer from 1 to about 10,000.

5. The resin system according to paragraph 3 or 4, wherein the symmetric cross-linker is selected from a di-acrylate, a bis(acrylamide), a di-epoxide, N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds and any combination thereof.

6. The resin system according to paragraph 3 or 4, wherein the symmetric cross-linker is selected from:

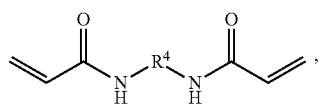

wherein R$^4$ is (CH$_2$)$_t$, and wherein t is 1, 2, or 3;

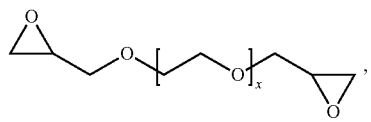

wherein x is from about 1 to about 100;

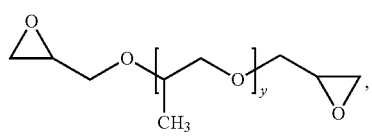

wherein y is from about 1 to about 100;

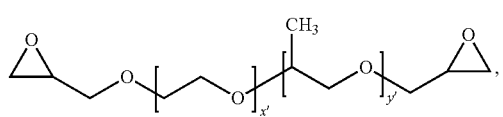

where x' is from about 0 to 100, y' is from about 0 to 100, and x'+y' is from about 1 to about 100;

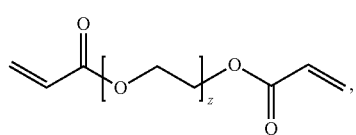

wherein z is from about 1 to about 100;

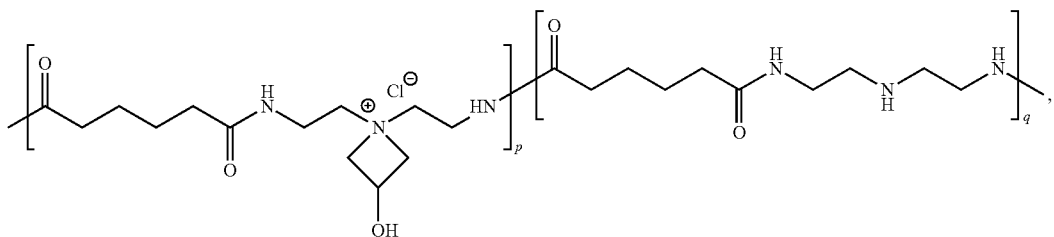

wherein a q/p ratio is from about 10 to about 1000; a copolymer of an acrylate monomer, a methacrylate monomer, an alkene monomer, or a diene monomer with an azetidinium-functionalized monomer selected from

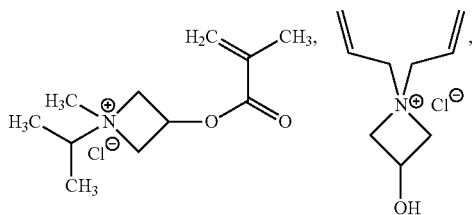

and a combination thereof, wherein the fraction of azetidinium-functionalized monomer to the acrylate monomer, the methacrylate monomer, the alkene monomer, or the diene monomer in the copolymer is from about 0.1% to about 12%; and any combination thereof.

7. The resin system according to any one of paragraphs 3 to 6, wherein the epihalohydrin is selected from epichlorohydrin, epibromohydrin, and epiiodohydrin.

8. The resin system according to any one of paragraphs 3 to 7, further comprising: reacting the polyamine with a mono-functional modifier prior to, during, or after treating with the symmetric cross-linker.

9. The resin system according to paragraph 8, wherein the mono-functional modifier is selected from alkyl acrylate, hydroxyalkyl acrylate, 2-(2-hydroxyethoxy)ethyl acrylate, acrylamide, alkyl acrylamide, N-alkylacrylamide, dialkyl acrylamide, N,N-dialkylacrylamide, acrylonitrile, 2-alkyl oxirane, 2-(allyloxyalkyl)oxirane, 2-(allyloxymethyl)oxirane, ω-(acryloyloxy)-alkyltrimethylammonium, ω-(acrylamido)-alkyltrimethylammonium, mono-epoxide, 1-isopropyl-3-(methacryloyloxy)-1-methylazetidinium chloride and any combination thereof.

10. The resin system according to any one of paragraphs 2 to 9, wherein the polyamidoamine-epihalohydrin resin has solid contents from about 10% to about 50%.

11. The resin system according to any one of paragraphs 2 to 10, wherein the polyamidoamine-epihalohydrin resin has a molecular weight from about $0.02 \times 10^6$ to about $3.0 \times 10^6$.

12. The resin system according to any one of paragraphs 1 to 11, wherein the second resin is a urea-formaldehyde resin.

13. The resin system according to paragraph 12, wherein the urea-formaldehyde resin has a molar ratio of formaldehyde to urea from about 1.5 to about 2.5.

14. The resin system according to paragraph 12 or 13, wherein the urea-formaldehyde resin has solid contents from about 10% to about 50%.

15. The resin system according to any one of paragraphs 12 to 14, wherein the urea-formaldehyde resin has a weight average molecular weight from about 14,000 to about 500,000.

16. The resin system according to any one of paragraphs 1 to 15, wherein the first resin or the second resin is in aqueous form or in solution form.

17. The resin system according to any one of paragraphs 1 to 16, wherein the period for sequential addition between the resins is 1 minute.

18. The resin system according to any one of paragraphs 1 to 17, wherein the period for sequential addition between the resins is 5 minutes.

19. The resin system according to any one of paragraphs 1 to 18, wherein the period for sequential addition between the resins is 10 minutes.

20. A process of preparing a paper product, comprising: contacting a plurality of pulp fibers with a resin system comprising: a first resin and a second resin, wherein: the first resin is present in an amount of about 1 wt % to about 99 wt %, based on the total weight the resin system; the second resin is present in an amount of about 1 wt % to about 99 wt %, based on the total weight the resin system; and adding the first resin or the second resin sequentially or simultaneously to the pulp fibers to produce a paper product; wherein the period for sequential addition between the resins is from about 1 second to about 1 hour.

21. The process according to paragraph 20, wherein the first resin is a conventional polyamidoamine-epihalohydrin resin or a non-conventional polyamidoamine-epihalohydrin resin using crosslinkers.

22. The process according to paragraph 21, wherein the non-conventional polyamidoamine-epihalohydrin resin is prepared by the process comprising: a) reacting a polyamine with a symmetric cross-linker to produce a partially cross-linked polyamine; b) adding a epihalohydrin to the partially cross-linked polyamine to produce a halohydrin-functionalized polymer; and c) cyclizing the halohydrin-functionalized polymer to form the resin having azetidinium moieties.

23. The process according to paragraph 22, wherein the polyamine has the structure

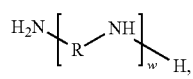

wherein R is alkyl, hydroxyalkyl, amine, amide, aryl, heteroaryl or cycloalkyl and w is an integer from 1 to about 10,000.

24. The process of claim 22, wherein the symmetric cross-linker is selected from a di-acrylate, a bis(acrylamide), a di-epoxide, N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds and any combination thereof.

25. The process according to paragraph 22, wherein the symmetric cross-linker is selected from:

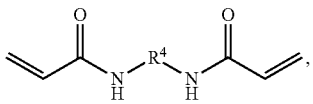

wherein $R^4$ is $(CH_2)_t$, and wherein t is 1, 2, or 3;

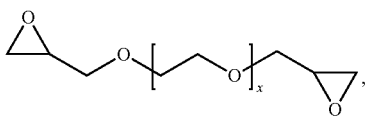

wherein x is from about 1 to about 100;

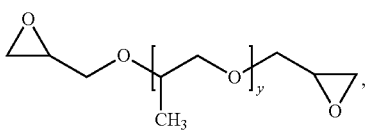

wherein y is from about 1 to about 100;

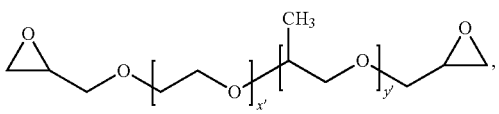

where x' is from about 0 to about 100, y' is from about 0 to about 100, and x'+y' is from about 1 to about 100;

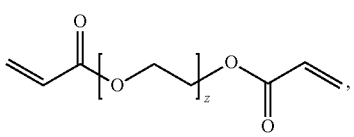

wherein z is from about 1 to about 100;

wherein a q/p ratio is from about 10 to about 1000; a copolymer of an acrylate monomer, a methacrylate monomer, an alkene monomer, or a diene monomer with an azetidinium-functionalized monomer selected from

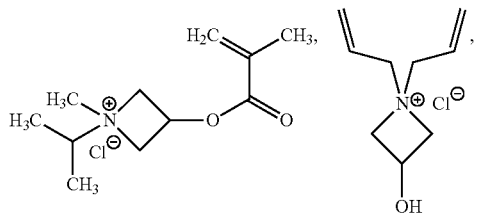

and a combination thereof, wherein the fraction of azetidinium-functionalized monomer to the acrylate monomer, the methacrylate monomer, the alkene monomer, or the diene monomer in the copolymer is from about 0.1% to about 12%; and any combination thereof.

26. The process according to any one of paragraphs 22 to 25, wherein the epihalohydrin is selected from epichlorohydrin, epibromohydrin, and epiiodohydrin.

27. The process according to any one of paragraphs 22 to 26, further comprising: reacting the polyamine with a mono-functional modifier prior to, during, or after treating with the symmetric cross-linker.

28. The process according to paragraph 27, wherein the mono-functional modifier is selected from alkyl acrylate, hydroxyalkyl acrylate, 2-(2-hydroxyethoxy)ethyl acrylate, acrylamide, alkyl acrylamide, N-alkylacrylamide, dialkyl acrylamide, N,N-dialkylacrylamide, acrylonitrile, 2-alkyl oxirane, 2-(allyloxyalkyl)oxirane, 2-(allyloxymethyl)oxirane, ω-(acryloyloxy)-alkyltrimethylammonium, ω-(acrylamido)-alkyltrimethylammonium, mono-epoxide, 1-isopropyl-3-(methacryloyloxy)-1-methylazetidinium chloride and any combination thereof.

29. The process according to any one of paragraphs 21 to 28, wherein the polyamidoamine-epihalohydrin resin has solid contents from about 10% to about 50%.

30. The process according to any one of paragraphs 21 to 29, wherein the polyamidoamine-epihalohydrin resin has a molecular weight from about $0.02 \times 10^6$ to about $3.0 \times 10^6$.

31. The process according to any one of paragraphs 20 to 30, wherein the second resin is a urea-formaldehyde resin.

32. The process according to paragraph 31, wherein the urea-formaldehyde resin has a molar ratio of formaldehyde to urea from about 1.5 to about 2.5.

33. The process according to paragraph 31 or 32, wherein the urea-formaldehyde resin has solid contents from about 10% to about 50%.

34. The process according to any one of paragraphs 31 to 33, wherein the urea-formaldehyde resin has a weight average molecular weight from about 14,000 to about 500,000.

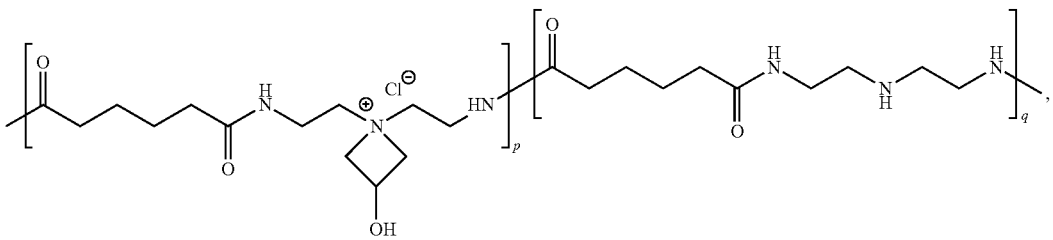

35. The process according to any one of paragraphs 20 to 34, wherein the first resin or the second resin is in aqueous form or in solution form.

36. The process according to any one of paragraphs 20 to 35, wherein the period for sequential addition between the resins is 1 minute.

37. The process according to any one of paragraphs 20 to 36, wherein the period for sequential addition between the resins is 5 minutes.

38. The process according to any one of paragraphs 20 to 37, wherein the period for sequential addition between the resins is 10 minutes.

39. A paper strengthened with the resin system according to any one of paragraphs 1 to 19.

40. A process of treating paper to impart wet strength, comprising: contacting a plurality of paper with a resin system comprising: a first resin and a second resin, wherein: the first resin is present in an amount of about 1 wt % to about 99 wt %, based on the total weight the resin system; the second resin is present in an amount of about 1 wt % to about 99 wt %, based on the total weight the resin system; adding the first resin or the second resin sequentially or simultaneously to the pulp fibers; wherein the period for sequential addition between the resins is from about 1 second to about 1 hour; and at least partially curing the resin system.

41. A paper product, comprising: a plurality of pulp fibers and an at least partially cured resin system, wherein the resin system, prior to curing, comprises: a first resin, wherein: the first resin is present in an amount of about 1 wt % to about 99 wt %, based on the total weight the resin system; and a second resin; wherein the second resin is present in an amount of about 1 wt % to about 99 wt %, based on the total weight the resin system; wherein the first resin or the second resin is added sequentially or simultaneously to the pulp fibers; and wherein the period for sequential addition between the resins is from about 1 second to about 1 hour.

42. A method for making a paper product, comprising: contacting a plurality of pulp fibers with a resin system comprising a first polyamidoamine-epihalohydrin resin and a second resin comprising a second polyamidoamine-epihalohydrin resin, a urea-formaldehyde resin, or a mixture thereof to produce a paper product, wherein the first resin and the second resin are sequentially or simultaneously contacted with the plurality of pulp fibers, and wherein the period for sequential addition between the first resin and the second resin is about 1 second to about 1 hour.

43. A paper product, comprising: a plurality of pulp fibers and an at least partially cured resin system, wherein the resin system, prior to curing, comprises a first polyamidoamine-epihalohydrin resin and a second resin comprising a second polyamidoamine-epihalohydrin resin, a urea-formaldehyde resin, or a mixture thereof, wherein the first resin and the second resin are sequentially or simultaneously contacted with the plurality of pulp fibers, and wherein the period for sequential addition between the first resin and the second resin is about 1 second to about 1 hour.

44. A composition comprising: a plurality of pulp fibers; and a resin system comprising a first polyamidoamine-epihalohydrin resin and a second resin comprising a second polyamidoamine-epihalohydrin resin, a urea-formaldehyde resin, or a mixture thereof, wherein the composition is made by contacting first resin and the second resin sequentially or simultaneously with the plurality of pulp fibers, and wherein the period for sequential addition between the first resin and the second resin is about 1 second to about 1 hour.

45. The method, product, or composition according to any one of paragraphs 42 to 44, wherein the plurality of pulp fibers is sequentially contacted with the first polyamidoamine-epihalohydrin resin followed by the second resin.

46. The method, product, or composition according to any one of paragraphs 42 to 45, wherein the plurality of pulp fibers is sequentially contacted with the first polyamidoamine-epihalohydrin resin followed by the second resin, and wherein the period for sequential addition between the first resin and the second resin is about 1 minute to about 15 minutes.

47. The method, product, or composition according to any one of paragraphs 42 to 46, wherein the first polyamidoamine-epihalohydrin resin has a pH of about 2 to about 4.5, a charge density of about 2 mEq/g of solids to about 4 mEq/g of solids, and a ratio of azetidinium moieties to amide residues of about 0.4 to about 1.3.

48. The method, product, or composition according to any one of paragraphs 42 to 47, wherein the first polyamidoamine-epihalohydrin resin comprises azetidinium moieties formed by cyclizing a halohydrin-functionalized polymer, wherein the halohydrin-functionalized polymer comprises halohydrin groups, and wherein about 90% or more of the halohydrin groups in the halohydrin-functionalized polymer are cyclized to form the azetidinium moieties.

49. The method, product, or composition according to any one of paragraphs 42 to 48, wherein the second resin comprises the urea-formaldehyde resin.

50. The method, product, or composition according to any one of paragraphs 42 to 47, wherein the first polyamidoamine-epihalohydrin resin is made by reacting a polyamine with a functionally-symmetric cross-linker to produce a partially cross-linked polyamine; reacting an epihalohydrin with the partially cross-linked polyamine to produce a halohydrin-functionalized polymer; and cyclizing the halohydrin-functionalized polymer to produce azetidium moieties.

51. The method, product, or composition according to paragraph 50, wherein the second resin comprises the urea-formaldehyde resin.

52. The method, product, or composition according to any one of paragraphs 42 to 51, wherein the epihalohydrin comprises epichlorohydrin, epibromohydrin, epiiodohydrin, or any mixture thereof.

53. The method, product, or composition according to any one of paragraphs 42 to 52, wherein the first polyamidoamine-epihalohydrin resin has solid content from about 10 wt % to about 50 wt %, a weight average molecular weight of about $0.02 \times 10^6$ to about $3.0 \times 10^6$, wherein the second resin comprises a urea-formaldehyde resin having a molar ratio of formaldehyde to urea of about 1.5 to about 2.5 and a solids content of about 10% to about 50%, and wherein the second resin is sequentially contacted with the pulp fibers with respect to the first polyamidoamine-epihalohydrin resin.

54. The method, product, or composition according to any one of paragraphs 42 to 53, wherein the polyamine has the structure

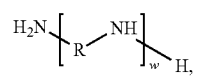

wherein R is alkyl, hydroxyalkyl, amine, amide, aryl, heteroaryl or cycloalkyl and w is an integer from 1 to about 10,000.

55. The method, product, or composition according to any one of paragraphs 42 to 54, wherein the functionally-symmetric cross-linker comprises a di-acrylate, a bis(acrylamide), a di-epoxide, N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds, or any combination thereof.

56. The method, product, or composition according to any one of paragraphs 42 to 55, wherein the functionally-symmetric cross-linker comprises:

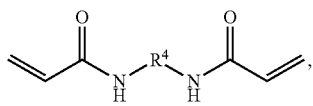

wherein R⁴ is $(CH_2)_t$, and wherein t is 1, 2, or 3;

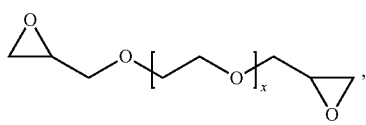

wherein x is from about 1 to about 100;

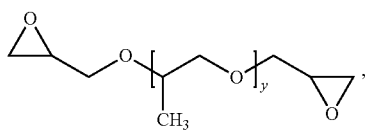

wherein y is from about 1 to about 100;

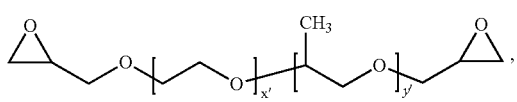

wherein x' is from about 0 to 100, y' is from about 0 to 100, and x'+y' is from about 1 to about 100;

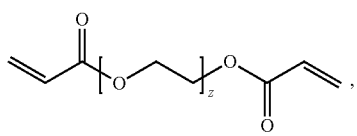

wherein z is from about 1 to about 100;

wherein a q/p ratio is from about 10 to about 1000; a copolymer of an acrylate monomer, a methacrylate monomer, an alkene monomer, or a diene monomer with an azetidinium-functionalized monomer selected from

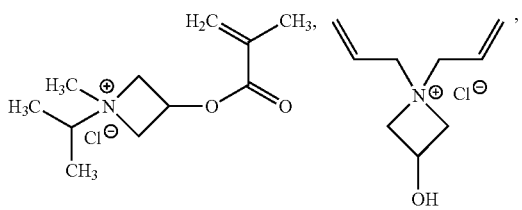

or any mixture thereof, wherein the fraction of azetidinium-functionalized monomer to the acrylate monomer, the methacrylate monomer, the alkene monomer, or the diene monomer in the copolymer is from about 0.1% to about 12%; and any mixture thereof.

57. The method, product, or composition according to any one of paragraphs 42 to 56, further comprising reacting the polyamine with a mono-functional modifier prior to, during, or after reacting with the functionally-symmetric cross-linker.

58. The method, product, or composition according to paragraph 57, wherein the mono-functional modifier is selected from alkyl acrylate, hydroxyalkyl acrylate, 2-(2-hydroxyethoxy)ethyl acrylate, acrylamide, alkyl acrylamide, N-alkylacrylamide, dialkyl acrylamide, N,N-dialkylacrylamide, acrylonitrile, 2-alkyl oxirane, 2-(allyloxyalkyl)oxirane, 2-(allyloxymethyl)oxirane, ω-(acryloyloxy)-alkyltrimethylammonium, ω-(acrylamido)-alkyltrimethylammonium, mono-epoxide, 1-isopropyl-3-(methacryloyloxy)-1-methylazetidinium chloride, and any mixture thereof.

59. The method, product, or composition according to any one of paragraphs 42 to 58, wherein the first polyamidoamine-epihalohydrin resin has a solids content of about 10% to about 50% and a weight average molecular weight of about $0.02 \times 10^6$ to about $3.0 \times 10^6$.

60. The method, product, or composition according to paragraph 59, wherein the second resin comprises the urea-formaldehyde resin, wherein the urea-formaldehyde resin has a molar ratio of formaldehyde to urea of about 1.5 to about 2.5 and a weight average molecular weight of about 14,000 to about 500,000.

61. The method, product, or composition according to any one of paragraphs 42 to 60, further comprising at least partially curing the resin system to produce the paper product.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A resin system for making paper products, comprising a polyamidoamine-epihalohydrin resin and a urea-formaldehyde resin, wherein the resin system comprises greater than 30 wt % to about 80 wt % of the urea-formaldehyde resin, based on a combined solids weight of the polyamidoamine-epihalohydrin resin and the urea-formaldehyde resin.

2. The resin system of claim 1, wherein the polyamidoamine-epihalohydrin resin comprises azetidinium ions and amide residues, and has a pH of about 2 to about 4.5, a charge density of about 2 mEq/g of solids to about 4 mEq/g of solids, and a ratio of azetidinium ions to amide residues of about 0.4 to about 1.3.

3. The resin system of claim 1, wherein the polyamidoamine-epihalohydrin resin comprises azetidinium ions and amide residues, and has a pH of about 2 to about 4.5, a charge density of about 2.5 mEq/g of solids to about 4 mEq/g of solids, and a ratio of azetidinium ions to amide residues of about 0.6 to about 1.

4. The resin system of claim 1, wherein the resin system comprises about 40 wt % to about 80 wt % of the urea-formaldehyde resin, based on the combined solids weight of the polyamidoamine-epihalohydrin resin and the urea-formaldehyde resin.

5. The resin system of claim 1, wherein the polyamidoamine-epihalohydrin resin comprises azetidinium ions and at least one polyamine that is partially crosslinked with a bridging moiety, and wherein the bridging moiety is derived from a functionally-symmetric cross-linker comprising a di-acrylate compound, a bis(acrylamide) compound, N,N'-methylene-bis-methacrylamide, a di-epoxide compound, a polyazetidinium compound, a poly(alkylene glycol) diglycidyl ether, or any mixture thereof.

6. The resin system of claim 5, wherein the polyamine has the chemical formula:

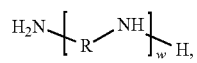

wherein R is an alkyl, a hydroxyalkyl, an amine, an amide, an aryl, a heteroaryl, or a cycloalkyl and w is an integer from 1 to about 10,000.

7. The resin system of claim 1, wherein the polyamidoamine-epihalohydrin resin comprises azetidinium ions and at least one polyamine that is partially crosslinked with a bridging moiety, and wherein the bridging moiety is derived from a functionally-symmetric cross-linker comprising a di-acrylate compound, a bis(acrylamide) compound, N,N'-methylene-bis-methacrylamide, a di-epoxide compound, poly(ethylene glycol) diglycidyl ether, a poly(propylene glycol) diglycidyl ether, or any mixture thereof.

8. The resin system of claim 1, wherein the polyamidoamine-epihalohydrin resin comprises azetidinium ions and at least one polyamine that is partially crosslinked with a bridging moiety, wherein the bridging moiety is derived from a functionally-symmetric cross-linker, and wherein the functionally-symmetric cross-linker comprises:

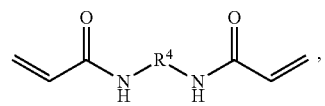

wherein $R^4$ is $(CH_2)_t$, and wherein t is 1, 2, or 3;

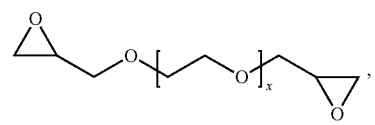

wherein x is from about 1 to about 100;

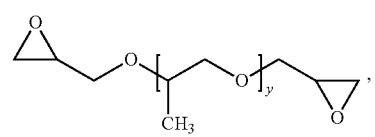

wherein y is from about 1 to about 100;

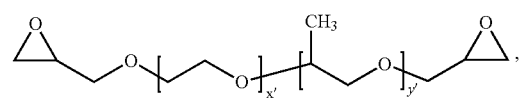

wherein x' is from about 0 to 100, y' is from about 0 to 100, and x'+y' is from about 1 to about 100;

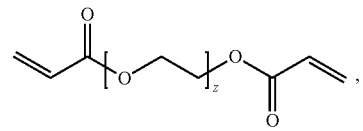

wherein z is from about 1 to about 100;

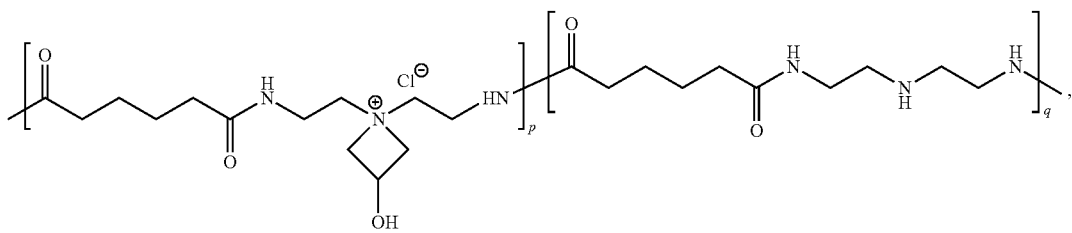

wherein a q/p ratio is from about 10 to about 1,000;
a copolymer of an acrylate monomer, a methacrylate monomer, an alkene monomer, or a diene monomer with an azetidinium-functionalized monomer comprising:

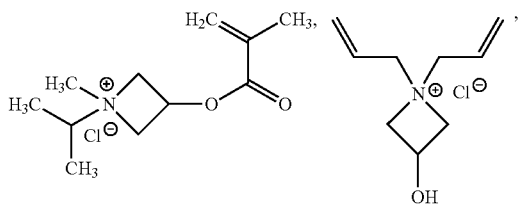

or a mixture thereof; or
any mixture thereof.

9. The resin system of claim 1, wherein the urea-formaldehyde resin has a molar ratio of formaldehyde to urea of about 1:1 to about 3:1 and a weight average molecular weight of about 1,000 to about 500,000.

10. The resin system of claim 1, wherein the polyamidoamine-epihalohydrin resin is synthesized by reacting a polyamine with a functionally-symmetric cross-linker to produce a partially cross-linked polyamine, reacting an epihalohydrin with the partially cross-linked polyamine to produce a halohydrin-functionalized polymer, and cyclizing the halohydrin-functionalized polymer, and wherein the functionally-symmetric cross-linker comprises a di-acrylate compound, a bis(acrylamide) compound, N,N'-methylene-bis-methacrylamide, a di-epoxide compound, a polyazetidinium compound, a poly(alkylene glycol) diglycidyl ether, or any mixture thereof.

11. The resin system of claim 10, wherein the synthesis of the polyamidoamine-epihalohydrin resin further comprises reacting the polyamine with a mono-functional modifier prior to, during, or after the polyamine is reacted with the functionally-symmetric cross-linker.

12. The resin system of claim 11, wherein the mono-functional modifier comprises an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, or any mixture thereof.

13. The resin system of claim 1, wherein the resin system further comprises a catalyst, and wherein the catalyst comprises sulfuric acid, hydrochloric acid, phosphoric acid, boric acid, acetic acid, tartaric acid, benzoic acid, propionic acid, adipic acid, oxalic acid, fumaric acid, hexachloric phthalic anhydride, maleic anhydride, ammonium chloride, magnesium chloride, zinc chloride, or any mixture thereof.

14. A resin system for making paper products, comprising a first polyamidoamine-epihalohydrin resin and a second resin comprising a second polyamidoamine-epihalohydrin resin, a urea-formaldehyde resin, or a mixture thereof, wherein the first polyamidoamine-epihalohydrin resin comprises azetidinium ions and at least one polyamine that is partially crosslinked with a bridging moiety, wherein the bridging moiety is derived from a functionally-symmetric cross-linker comprising a di-acrylate compound, a bis(acrylamide) compound, N,N'-methylene-bis-methacrylamide, a di-epoxide compound, a polyazetidinium compound, a poly(alkylene glycol) diglycidyl ether, or any mixture thereof, and wherein the first polyamidoamine-epihalohydrin resin and the second resin have at least one different property with respect to one another.

15. The resin system of claim 14, wherein the second resin comprises the urea-formaldehyde resin, and wherein the resin system comprises greater than 30 wt % to about 80 wt % of the second resin, based on a combined solids weight of the first polyamidoamine-epihalohydrin resin and the second resin.

16. The resin system of claim 14, wherein the first polyamidoamine-epihalohydrin resin comprises azetidinium ions and amide residues, and has a pH of about 2 to about 4.5, a charge density of about 2 mEq/g of solids to about 4 mEq/g of solids, and a ratio of azetidinium ions to amide residues of about 0.4 to about 1.3, and wherein the at least one different property is a molecular weight, a chemical structure, or both.

17. The resin system of claim 14, wherein the polyamine has the chemical formula:

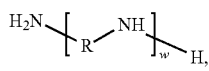

wherein R is an alkyl, a hydroxyalkyl, an amine, an amide, an aryl, a heteroaryl, or a cycloalkyl and w is an integer from 1 to about 10,000.

18. A method for making a resin system, comprising combining a polyamidoamine-epihalohydrin resin and a urea-formaldehyde resin to produce the resin system, wherein the resin system comprises greater than 30 wt % to about 80 wt % of the urea-formaldehyde resin, based on a combined solids weight of the polyamidoamine-epihalohydrin resin and the urea-formaldehyde resin.

19. The method of claim 18, wherein:
the polyamidoamine-epihalohydrin resin comprises azetidinium ions and at least one polyamine that is partially crosslinked with a bridging moiety,
the bridging moiety is derived from a functionally-symmetric cross-linker comprising a di-acrylate compound, a bis(acrylamide) compound, N,N'-methylene-bis-methacrylamide, a di-epoxide compound, a polyazetidinium compound, a poly(alkylene glycol) diglycidyl ether, or any mixture thereof, the urea-formaldehyde resin has a molar ratio of formaldehyde to urea of about 1:1 to about 3:1 and a weight average molecular weight of about 1,000 to about 500,000, and the polyamidoamine-epihalohydrin resin and the urea-formaldehyde resin are combined in the presence of a plurality of pulp fibers.

20. The method of claim 18, wherein the resin system comprises about 40 wt % to about 80 wt % of the urea-formaldehyde resin, based on the combined solids weight of the polyamidoamine-epihalohydrin resin and the urea-formaldehyde resin.

* * * * *